US 12,342,292 B2
Page 2

(12) United States Patent
Seo et al.

(10) Patent No.: US 12,342,292 B2
(45) Date of Patent: Jun. 24, 2025

(54) PILOT POWER CONTROL TECHNOLOGY FOR COMPENSATING FOR NONLINEARITY OF AMPLIFIER

(71) Applicant: Samsung Electronics Co., Ltd., Gyeonggi-do (KR)

(72) Inventors: Bongsung Seo, Gyeonggi-do (KR); Suhwook Kim, Gyeonggi-do (KR); Seungil Park, Gyeonggi-do (KR); Sangho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 360 days.

(21) Appl. No.: 18/078,423

(22) Filed: Dec. 9, 2022

(65) Prior Publication Data

US 2023/0189164 A1 Jun. 15, 2023

(30) Foreign Application Priority Data

Dec. 9, 2021 (KR) ........................ 10-2021-0175543

(51) Int. Cl.
*H04W 52/24* (2009.01)
*H04W 52/32* (2009.01)

(52) U.S. Cl.
CPC ......... *H04W 52/325* (2013.01); *H04W 52/24* (2013.01)

(58) Field of Classification Search
CPC ... H04W 52/32; H04W 52/325; H04W 52/24; H04L 1/0029; H04L 1/0026
See application file for complete search history.

(56) References Cited

U.S. PATENT DOCUMENTS 6,859,762 B2 * 2/2005 Mawet ................. H03M 1/123
702/194
7,269,205 B2 * 9/2007 Wang ................. H04L 27/3809
375/E1.032
(Continued)

FOREIGN PATENT DOCUMENTS

EP 1623505 B1 * 2/2010 ............. H04B 1/713
EP 2810390 B1 * 12/2018 ............ H04B 7/0456
(Continued)

OTHER PUBLICATIONS

International Search Report dated Mar. 16, 2023 Issued in counterpart application No. PCT/KR2022/020006, 7 pages.
(Continued)

*Primary Examiner* — Hai V Nguyen
(74) *Attorney, Agent, or Firm* — The Farrell Law Firm, P.C.

(57) ABSTRACT

The disclosure relates to a method and a device for transmitting and receiving a signal by a base station or a terminal in a wireless communication system. Specifically, a method performed by a first device in a wireless communication system includes deriving an amplitude scaling factor based on a comparison between amplitude distribution of a pilot signal corresponding to a first time resource domain and the amplitude distribution of a data signal corresponding to a second time resource domain; and transmitting, to a second device, a physical channel including the pilot signal and the data signal and the amplitude scaling factor, wherein the pilot signal is transmitted with a power determined based on the amplitude scaling factor, and power compensation for the data signal is based on the amplitude scaling factor.

16 Claims, 22 Drawing Sheets

(56) References Cited

U.S. PATENT DOCUMENTS

| | | | | |
|---|---|---|---|---|
| 7,403,569 | B2* | 7/2008 | Redfern | H04L 27/2602 375/295 |
| 8,300,725 | B2* | 10/2012 | Kishigami | H04L 25/0232 375/295 |
| 8,331,420 | B2* | 12/2012 | Kleider | H04L 27/2621 370/510 |
| 8,989,307 | B2* | 3/2015 | Zhou | H03F 1/3258 375/221 |
| 9,608,718 | B2* | 3/2017 | Monsen | H04B 1/7093 |
| 9,832,780 | B2* | 11/2017 | Burström | H04W 52/325 |
| 10,523,159 | B2* | 12/2019 | Megretski | H03F 1/3258 |
| 10,524,212 | B2* | 12/2019 | Zhou | H04W 72/23 |
| 10,630,323 | B2* | 4/2020 | Spring | H04B 1/0475 |
| 11,076,360 | B2 | 7/2021 | Zhou et al. | |
| 11,115,068 | B2* | 9/2021 | Kasargod | H04B 1/0475 |
| 11,153,775 | B2* | 10/2021 | Kim | H04W 52/0212 |
| 11,251,755 | B2* | 2/2022 | Choi | H03F 3/189 |
| 11,516,751 | B2* | 11/2022 | Do | H04L 5/0048 |
| 11,553,435 | B2* | 1/2023 | Hu | H04W 52/54 |
| 11,671,059 | B2* | 6/2023 | Choi | H03F 3/24 330/149 |
| 11,778,536 | B2* | 10/2023 | Kim | H04W 4/70 370/329 |
| 11,832,274 | B2* | 11/2023 | Abdoli | H04L 5/0044 |
| 11,863,210 | B2* | 1/2024 | Megretski | H03F 3/24 |
| 11,949,487 | B2* | 4/2024 | Zhou | H04B 7/0695 |
| 11,985,675 | B2* | 5/2024 | Kim | H04L 1/08 |
| 2005/0002478 | A1* | 1/2005 | Agami | H03G 3/005 375/345 |
| 2005/0163199 | A1* | 7/2005 | Wang | H04L 27/3809 375/E1.032 |
| 2005/0169392 | A1* | 8/2005 | Redfern | H04L 1/08 375/260 |
| 2008/0165904 | A1 | 7/2008 | Sidi et al. | |
| 2008/0198942 | A1* | 8/2008 | Akella | H04L 27/2647 375/260 |
| 2010/0220808 | A1* | 9/2010 | Kishigami | H04L 25/0232 375/295 |
| 2011/0149929 | A1* | 6/2011 | Kleider | H04L 5/0023 370/344 |
| 2011/0244905 | A1* | 10/2011 | Burstrom | H04W 52/325 455/507 |
| 2012/0039282 | A1 | 2/2012 | Kim et al. | |
| 2012/0044981 | A1* | 2/2012 | Nissila | H04L 25/03171 375/224 |
| 2013/0195227 | A1* | 8/2013 | Charbonneau | H04L 27/38 375/340 |
| 2014/0229136 | A1* | 8/2014 | Reth | G01C 25/005 702/96 |
| 2014/0254716 | A1* | 9/2014 | Zhou | H04B 1/0475 375/296 |
| 2016/0091587 | A1* | 3/2016 | Benner | G01R 33/543 324/322 |
| 2016/0359552 | A1* | 12/2016 | Monsen | H04B 7/0639 |
| 2017/0371070 | A1* | 12/2017 | Teyssandier | G01V 13/00 |
| 2018/0006864 | A1* | 1/2018 | Hwang | H04L 5/0094 |
| 2018/0027441 | A1* | 1/2018 | Kim | H04W 52/243 370/311 |
| 2019/0074882 | A1* | 3/2019 | Zhou | H04W 72/21 |
| 2019/0326942 | A1* | 10/2019 | Spring | H04B 1/0458 |
| 2020/0137745 | A1* | 4/2020 | Bachu | H04W 72/0453 |
| 2021/0013844 | A1* | 1/2021 | Choi | H04B 1/0475 |
| 2021/0203369 | A1* | 7/2021 | Kasargod | H04B 1/0475 |
| 2021/0212031 | A1* | 7/2021 | Li | H04W 72/23 |
| 2021/0266846 | A1* | 8/2021 | Do | H04L 5/001 |
| 2021/0266875 | A1 | 8/2021 | Namgoong et al. | |
| 2021/0352567 | A1* | 11/2021 | Kim | H04W 48/02 |
| 2022/0015089 | A1* | 1/2022 | Shin | H04L 1/1819 |
| 2022/0115991 | A1* | 4/2022 | Choi | H03F 3/189 |
| 2022/0116881 | A1* | 4/2022 | Shin | H04W 52/14 |
| 2022/0271982 | A1* | 8/2022 | Alawieh | H04L 27/2602 |
| 2022/0394680 | A1* | 12/2022 | Kim | H04L 1/1893 |
| 2023/0260528 | A1* | 8/2023 | Neumann | G10L 25/18 704/203 |
| 2024/0015667 | A1* | 1/2024 | Bavand | H04W 52/367 |
| 2024/0357516 | A1* | 10/2024 | Guo | H04W 52/367 |

FOREIGN PATENT DOCUMENTS

| | | | | |
|---|---|---|---|---|
| EP | 3910850 | A1 * | 11/2021 | H04L 1/0036 |
| JP | 2006-295766 | | 10/2006 | |
| JP | 2008-160822 | | 7/2008 | |
| JP | 2009-218706 | | 9/2009 | |
| KR | 10-2009-0096552 | | 9/2009 | |
| KR | 10-2012-0015797 | | 2/2012 | |
| KR | 10-2018-0093971 | | 8/2018 | |
| KR | 1020210007277 | | 1/2021 | |
| KR | 10-2314295 | | 10/2021 | |
| WO | WO-2007025712 | A1 * | 3/2007 | H04B 1/712 |
| WO | WO 2016-143996 | | 9/2016 | |
| WO | WO-2019055861 | A1 * | 3/2019 | H04L 27/1566 |
| WO | WO-2021029442 | A1 * | 2/2021 | |

OTHER PUBLICATIONS

European Search Report dated Nov. 22, 2024 Issued in counterpart application No. 22904706.3-1206, 9 pages.

* cited by examiner

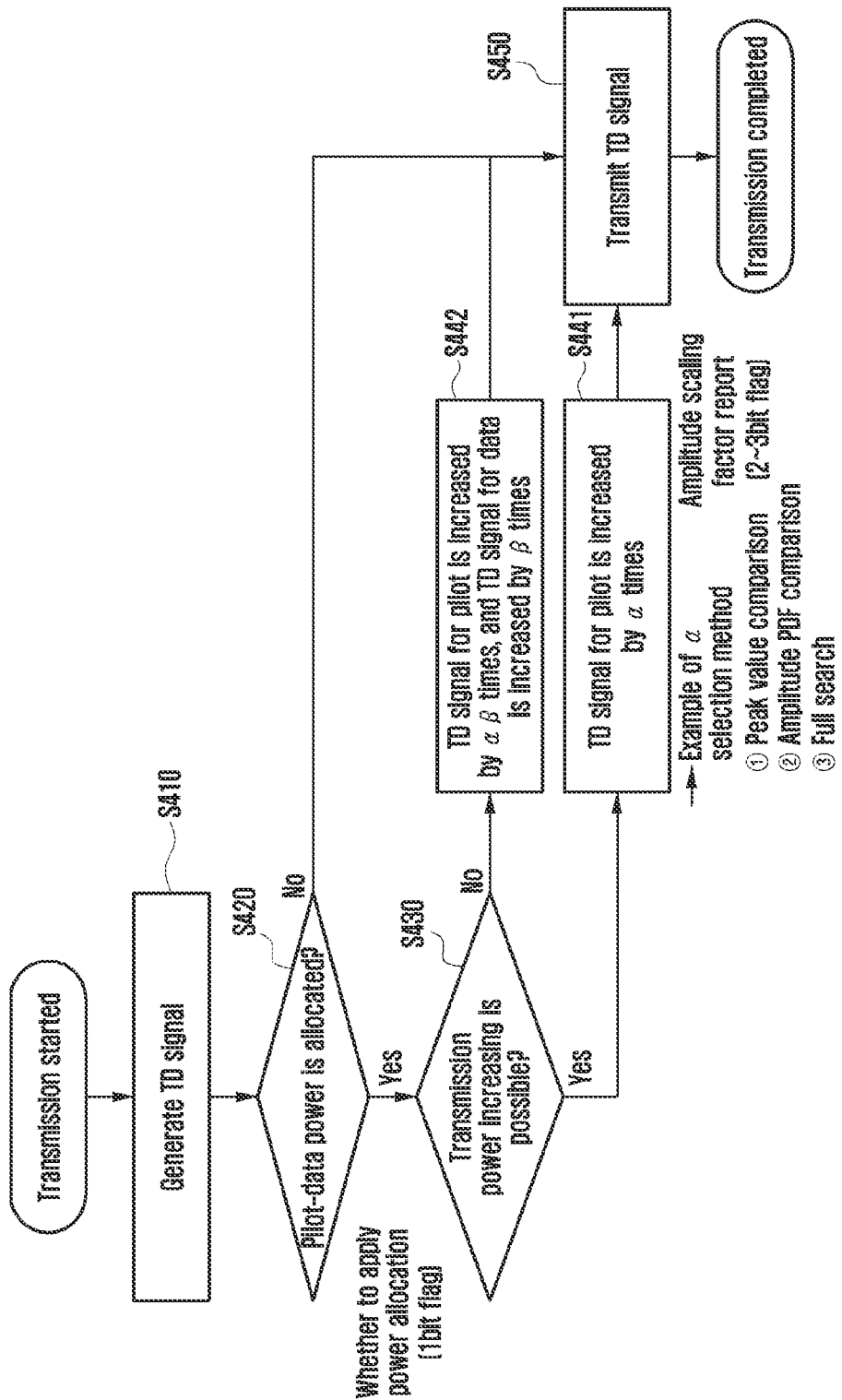

PILOT POWER CONTROL TECHNOLOGY FOR COMPENSATING FOR NONLINEARITY OF AMPLIFIER

CROSS-REFERENCE TO RELATED APPLICATION(S)

This application is based on and claims priority under 35 U.S.C. § 119 to Korean Patent Application No. 10-2021-0175543, filed on Dec. 9, 2021, in the Korean Intellectual Property Office, the entire disclosure of which is incorporated herein by reference.

BACKGROUND

1. Field

The disclosure relates to a method and a device for transmitting and receiving a signal by a base station (BS) or terminal in a wireless communication system. More specifically, the disclosure relates to a method and a device for compensating for the nonlinearity of a power amplifier when transmission power of a signal to be transmitted and received by a base station or terminal is increased through the amplifier.

2. Description of Related Art

5th generation (5G) mobile communication technologies define broad frequency bands such that high transmission rates and new services are possible, and can be implemented not only in "sub 6 GHz" bands such as 3.5 GHz, but also in "above 6 GHz" bands referred to as mm Wave including 28 GHz and 39 GHz. In addition, it has been considered to implement 6th generation (6G) mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G (6th-generation) mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Considering the development of wireless communication from generation to generation, technologies have been developed mainly for services targeting humans, such as voice calls, multimedia services, and data services. Following the commercialization of 5G communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and: factory equipment. Mobile devices are expected to evolve in various form-factors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 µsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to more severe path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive MIMO, FD-MIMO, array antennas, and multiantenna transmission technologies such as large-scale antennas. In addition, there has been ongoing discussion on new technologies for improving the coverage of terahertz-band signals, such as metamaterial-based lenses and antennas, OAM, and RIS.

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile BSs and the like and enabling network operation optimization and automation and the like; a dynamic spectrum sharing technology via collision avoidance based on a prediction of spectrum usage; use of AI in wireless communication for improvement of overall network operation by utilizing AI from a designing phase for developing 6G and internalizing end-to-end AI support functions; and next-generation distributed computing technology for overcoming the limit of UE computing ability through reachable super-high-performance communication and computing resources (such as MEC, clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive XR, high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances. In order to satisfy these various services, a wide bandwidth is required. Accordingly, research on a high bandwidth that has not been used before is being conducted, and mmWave and THz research are being conducted in . . . 5G and beyond-6G communication systems. However, in the ultra-high frequency band, the propagation path loss of radio waves is serious, resulting in narrow coverage. Due to this issue, in the case of BSs with narrow coverage, too many BSs are required to be installed and thus a lot of initial investment cost (CAPEX) is consumed.

Various technologies have been proposed to solve the aforementioned coverage issue. Among the technologies, a method for performing transmission with a higher-output power using a power amplifier (PA) has been proposed. However, since non-linearity in which the phase and amplitude of the transmission signal are distorted occurs in the high-output power region of the PA, the use of a PA with high-output power may be limited. Accordingly, a back-off process of limiting the operating range of the PA to an output power lower than the maximum output power of the PA may be performed to prevent operation in a nonlinear region. When the back-off process is applied, a probability in which the PA input signal is included in the nonlinear region is lowered, thereby preventing deterioration in data reception performance due to nonlinearity. However, the transmission power is relatively lowered, resulting in coverage loss.

In order to solve this problem, peak-to-average power ratio (PAPR) reduction technology, digital pre-distortion (DPD) technology, and non-linearity compensation (NC) technology are being considered. In addition, research on a method for solving the nonlinearity using AI is also being conducted.

AI can be divided into (i) supervised learning in which a ground-truth value is basically given, and a model is trained by learning the ground-truth value as the labeling value of training data; (ii) unsupervised learning that extracts relationships and characteristics between data without a ground truth value; and (iii) reinforcement learning in which AI is trained through a reward system. Although among these supervised learning may have difficulty in collecting labeled data, supervised learning can train AI with good performance.

There are two types of AI: (i) an offline-training method for loading a well-trained model from the beginning, and (ii) an online-training method for continuously updating a model to reflect the ever-changing environment. In the offline-training method, in case that a model does not need to be changed, additional training is unnecessary after training the model once with a large dataset. In other words, the model may be pre-trained during a chip design process, and the trained AI model may be loaded into a chip algorithm. However, in case that the environment continuously changes, a fixed model may have difficulty reflecting the changing environment, and thus online-training in which the model is continuously updated is necessary.

Meanwhile, the Internet is evolving from a human-centered connection network through which humans create and consume information to an IoT network through which distributed elements such as objects exchange and process information. Internet of everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, M2M communication, or MTC, has recently been studied. In an IoT environment, intelligent IoT services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology and various industries.

As described above, various services can be provided according to the development of a mobile communication system, and thus particularly a method for improving data reception performance and increasing coverage through compensation of the nonlinearity of a PA is required.

SUMMARY

The disclosure provides a method for improving data reception performance by compensating for the nonlinearity of a PA in a wireless communication system.

According to an embodiment, accurate PA input/output relationship information for compensation of the nonlinearity of a PA can be obtained by performing power allocation by considering the distribution of a pilot transmission part and a data transmission part of a transmission signal.

Further, according to an embodiment, PA nonlinearity can be effectively compensated for based on the PA input/output relationship information.

In addition, according to an embodiment, data reception performance can be improved and coverage can be increased through NC technology.

According to an embodiment, a method performed by a first device in a wireless communication system includes deriving an amplitude scaling factor based on a comparison between amplitude distribution of a pilot signal corresponding to a first time resource domain and amplitude distribution of a data signal corresponding to a second time resource domain; and transmitting, to a second device, the amplitude scaling factor and a physical channel including the pilot signal and the data signal, wherein the pilot signal is transmitted with a power determined based on the amplitude scaling factor, and wherein power compensation for the data signal is performed based on the amplitude scaling factor.

According to an embodiment, a method performed by a second device in a wireless communication system includes receiving, from a first device, a physical channel including a pilot signal and a data signal and an amplitude scaling factor associated with power of the pilot signal; and performing power compensation for the data signal based on the amplitude scaling factor, wherein the amplitude scaling factor is derived based on a comparison between amplitude distribution of the pilot signal corresponding to a first time resource domain and amplitude distribution of the data signal corresponding to a second time resource domain.

According to an embodiment, a first device in a wireless communication system includes a transceiver; a power amplifier; and a controller configured to derive an amplitude scaling factor based on a comparison between amplitude distribution of a pilot signal corresponding to a first time resource domain and amplitude distribution of a data signal corresponding to a second time resource domain, and transmit, to a second device, the amplitude scaling factor and a physical channel including the pilot signal and the data signal through the transceiver, wherein the pilot signal is transmitted with a power determined based on the amplitude scaling factor, and wherein power compensation for the data signal is performed based on the amplitude scaling factor.

According to an embodiment, a second device in a wireless communication system includes a transceiver; and a controller configured to receive, from a first device, a physical channel including a pilot signal and a data signal and an amplitude scaling factor associated with power of the pilot signal through the transceiver, and perform power compensation for the data signal based on the amplitude scaling factor, wherein the amplitude scaling factor is derived based on a comparison between amplitude distribution of the pilot signal corresponding to a first time resource domain and amplitude distribution of the data signal corresponding to a second time resource domain.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an operation flowchart of a transmission node configured to perform power control of a pilot part in order to compensate for the nonlinearity of a PA according to an embodiment;

DETAILED DESCRIPTION

As described above, a power amplifier (PA) may be used to amplify output power of a signal in a transmission node in order to increase coverage and the like.

Figure 1:
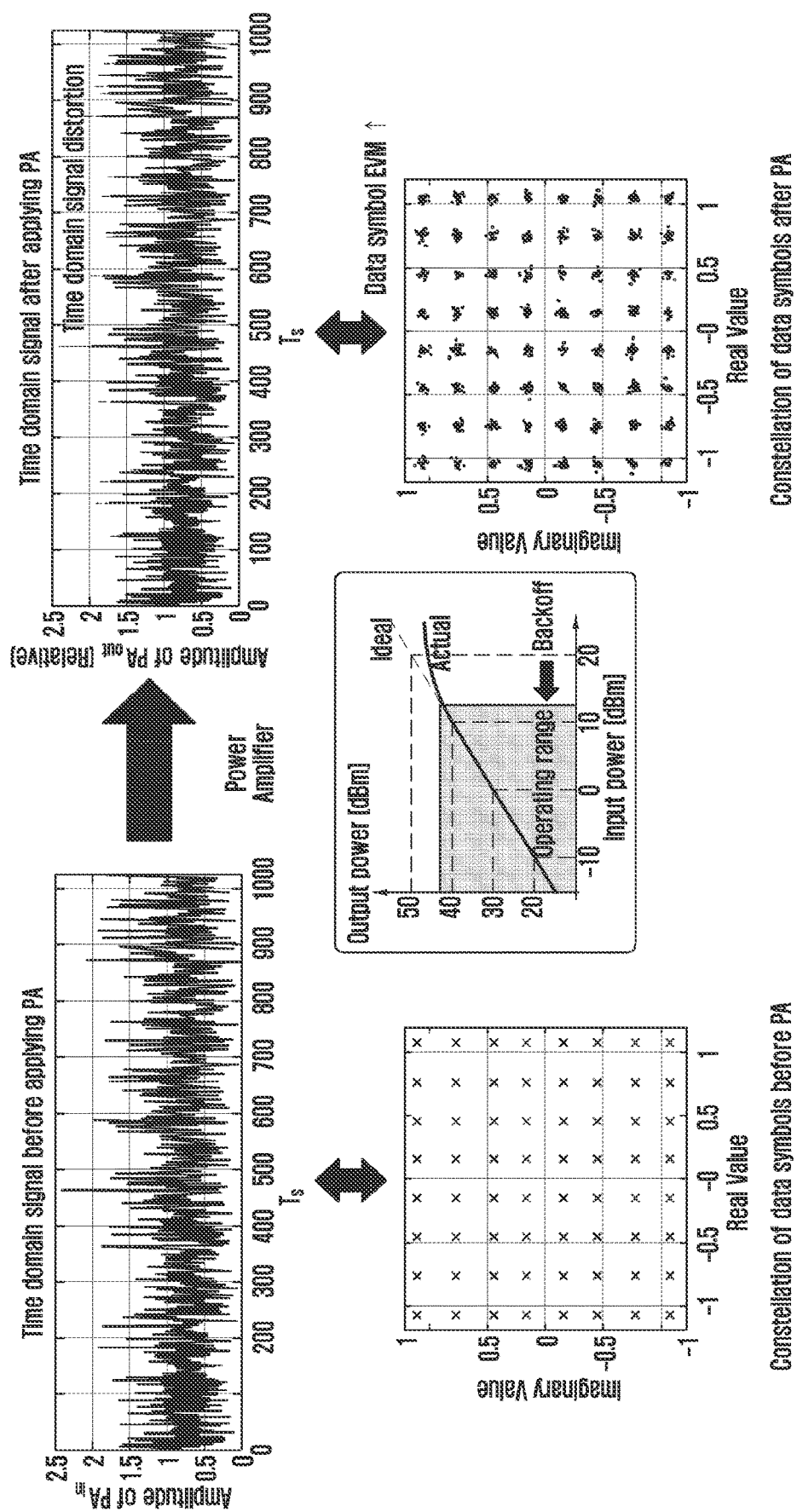
FIG. 1 illustrates an example showing signal distortion due to a nonlinearity of a PA.

FIG. 1 illustrates an example of signal distortion due to a nonlinearity of a PA.

Referring to FIG. 1, when a PA is used, a problem in which an error vector magnitude (EVM) of a transmission data symbol increases and data reception performance deteriorates may occur due to a nonlinearity in which the phase and strength of a signal are distorted in a high-output power region. A method for limiting the operating range of the PA to a linear section by applying a back-off to reduce the influence caused by the above problem may reduce the EVM of a transmitted symbol while reducing the transmission output power so as to cause coverage loss.

Hereinafter, in order to solve this problem, the disclosure provides a method for improving data reception performance by compensating for the nonlinearity of a PA in a wireless communication system. In the disclosure, a method for compensating for the nonlinearity of a PA will be referred to as a non-linearity compensation (NC) technology or an NC method. However, the use of these terms does not limit the technical scope of the disclosure.

The NC technology for compensating for the nonlinearity of a PA disclosed herein may include a process of deriving and reporting an amplitude scaling factor based on a pilot part and a data part of a transmission signal in the transmission node. Further, the NC technology may include a process of acquiring PA input/output relationship information and a process of compensating for non-linearity of a data transmission part of a received signal based on the acquired information, in the reception node. Here, the PA input/output relationship information of the reception node may be obtained by comparing a pilot pattern commonly known to the transmission node and the reception node with a pilot transmission part of a signal actually received by the reception node.

Here, the pilot may refer to a pilot signal or a reference signal (RS) used to match time and frequency synchronization between a transmission node and a reception node and exchange information on a channel. For example, the pilot or reference signal may include a primary synchronization signal (PSS) and a secondary synchronization signal (SSS) used for initial access, a demodulation RS (DMRS) used to estimate a channel value required during demodulation of transmission data, a channel state information-RS (CSI-RS) used by a terminal to estimate a downlink (DL) channel state, and a sounding RS (SRS) used by a BS to estimate an uplink (UL) channel state. The pilot signal or reference signal may be predefined or preconfigured in common for the transmission node and the reception node.

In the disclosure, for convenience of explanation, the pilot signal or reference signal (RS) may be collectively referred to as a pilot. However, the use of these terms does not limit the technical scope of the disclosure, and may be replaced by terms such as a pilot signal and a pilot symbol.

In addition, in the disclosure, an example in which DMRS is used as a pilot will be mainly described. When the DMRS is selected and power control therefor is performed to have a distribution, an effective channel having characteristics similar to that of a data transmission part of a nonlinear transmission signal of the PA has a similar effect on a data symbol and a DMRS transmission part, and thus it is possible to estimate a channel more suitable for demodulation and to expect the effect of improving reception performance. However, the DMRS is only one example of signals usable as the pilot and does not limit the technical scope of the disclosure. Therefore, as described above, other types of RS such as PSS, SSS, SRS, or CSI-RS may be used instead of DMRS.

The acquired PA input/output relationship information may affect NC performance to be performed for the data transmission part of the received signal of the reception node. The more similar the distribution characteristics between the pilot transmission part of the transmission signal used during acquisition of the PA input/output relationship information and the data transmission part of the transmission signal for performing the NC by using the PA input/output relationship information, the more effectively compensating for the PA nonlinearity. When the NC technology is performed in the reception node, back-off applied to the PA can be reduced and output power can be increased, thereby increasing coverage.

Figure 2:
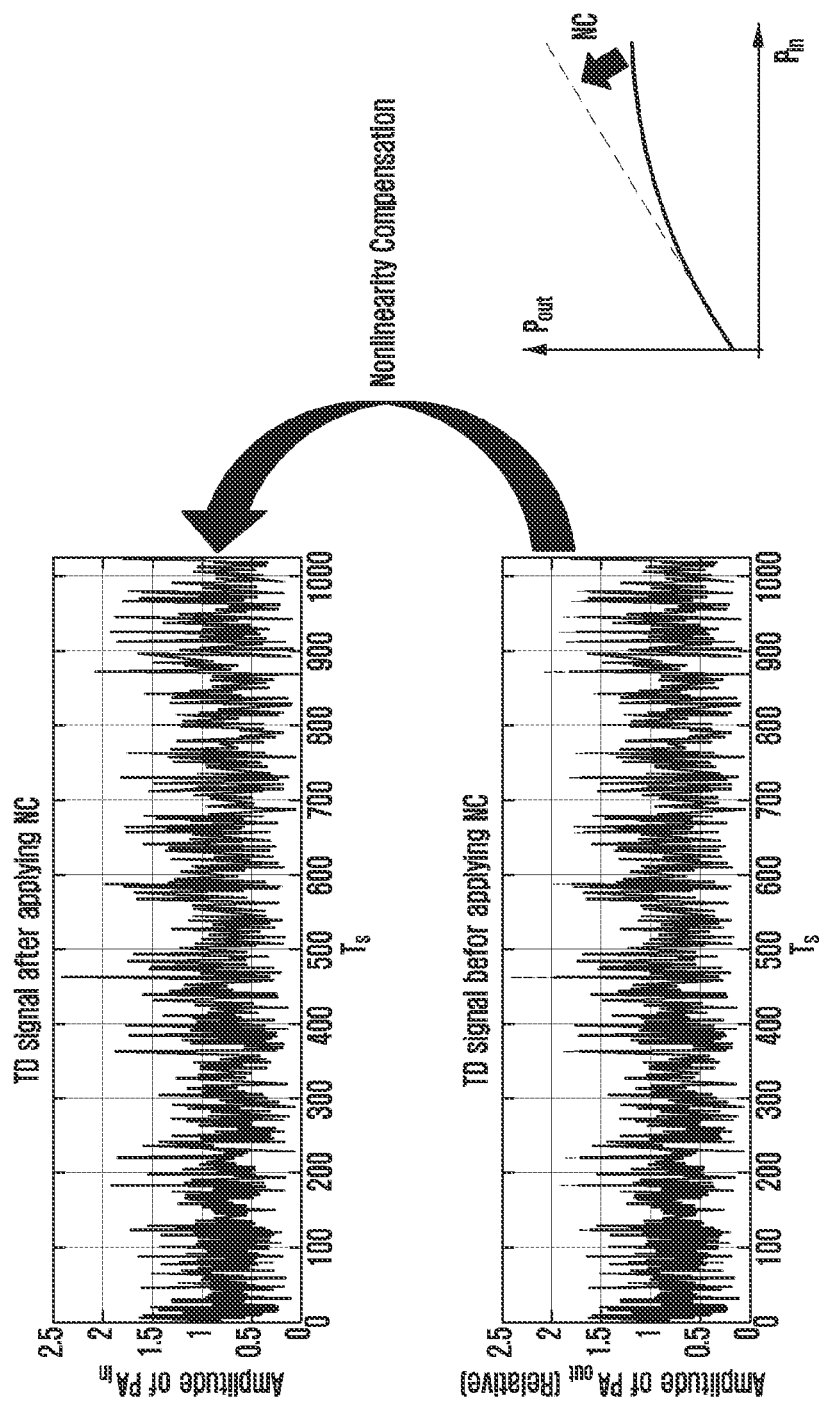
FIG. 2 illustrates an effect of improving data reception performance when NC technology according to an embodiment is applied.

FIG. 2 illustrates an effect of improving data reception performance when the NC technology is applied according to an embodiment.

To this end, a method of controlling the transmission power strength of the pilot for the NC may be considered. Unlike the existing method of controlling the pilot transmission power, the disclosure provides a method for effectively improving NC performance by deriving a factor causing the characteristics of amplitude distribution between the data transmission part and the pilot transmission part of the transmission signal to be similar to each other and applying the factor. In addition, the NC technology disclosed herein can be applied together with existing pilot transmission power control schemes for other purposes, such as improving channel estimation performance.

The disclosure includes, in order to acquire appropriate PA input/output relationship information, a process of controlling the amplitude of a pilot by comparing a pilot part and a data transmission part of a signal transmitted from a transmission node to derive an amplitude scaling factor causing the distribution characteristics of the two parts to be similar to each other, and reporting the value of the amplitude scaling factor to a reception node so as to consider the pilot amplitude control during data reception in the reception node.

A method of deriving the amplitude scaling factor (a) by a transmission node will be described in detail. First, in a time domain, a pilot part (e.g., a symbol to which a pilot is mapped) and a data transmission part (e.g., a symbol to which data is mapped) of a transmission signal may be distinguished to represent respective amplitude distributions. Next, the amplitude distribution obtained by multiplying the amplitude of the pilot part of the transmission signal by α may be compared with the amplitude distribution of the data transmission part. Here, the comparison may be performed while changing a value of α, and the α value causing the amplitude distributions of the pilot part and the data transmission part to be most similar may be selected.

Various methods may be used as a metric for selecting a by determining the similarity of the distributions of the pilot part and the data part.

Figure 3A:
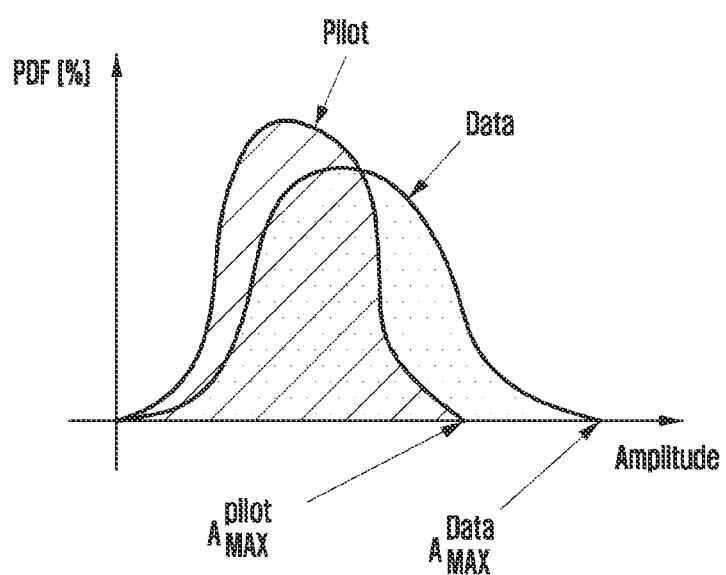
FIG. 3A illustrates an example of a metric for selecting an amplitude scaling factor.
Figure 3B:
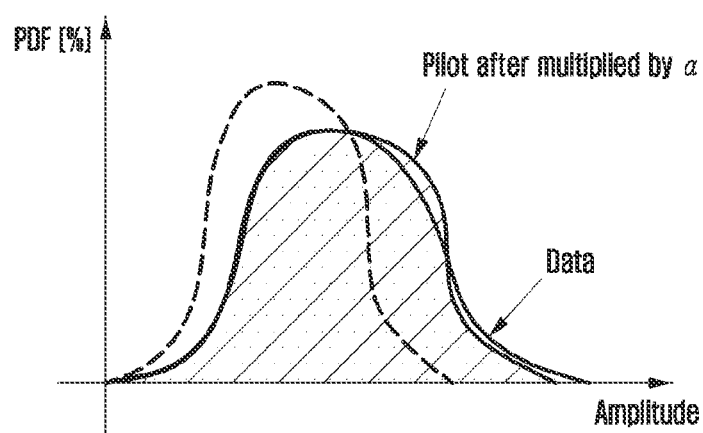
FIG. 3B illustrates an example of a metric for selecting an amplitude scaling factor.

FIGS. 3A and 3B illustrate examples of a metric for selecting an amplitude scaling factor α.

Referring to FIG. 3A, peak values of a pilot transmission part and a data transmission part of a transmission signal may be compared so as to select α value causing the peak values to be similar. Here, α may be expressed as in Equation (1).

$$a = \operatorname{argmin}|A_{MAX}^{Data} - \alpha A_{MAX}^{Pilot}|\alpha \quad (1)$$

That is, a value, which causes the difference between the peak value of the amplitude distribution of the pilot signal and the peak value of the amplitude distribution of the data signal to be the smallest, may be selected as the amplitude scaling factor.

As another example, by considering that the nonlinearity of the PA mainly affects the high-output power region, α value of minimizing the difference between the distributions of the top X % (0<X<=100) based on the amplitude of the pilot transmission part and the data transmission part may be selected. The X value may be predefined or may be configured/instructed to the transmission node through higher layer signaling.

Referring to FIG. 3B, based on a probability density function (PDF) of the amplitude, α value causing the distributions between the pilot transmission part and the data transmission part to be most similar may be selected. Here, α may be expressed as in Equation (2).

$$\alpha = \operatorname*{argmin}_{\alpha} \int_{A_{min}^{limit}}^{A_{MAX}^{limit}} |f_{Data} - f_{\alpha Pilot}| dA \quad (2)$$

For another example, in case that the computational capability of the transmission node is sufficiently excellent, it is also possible to select α with the best performance by comparing all NC performances when NC is performed by applying all possible a values that can be reported by considering that both data symbols and pilots transmitted by the transmission node are known.

Here, α may be expressed as a ratio between the average amplitude of the data symbol transmission part and the average amplitude of the pilot transmission part, as shown in Equation (3).

$$\alpha = \sqrt{\frac{E\{|x_{Pilot}|^2\}}{E\{|x_{Data}|^2\}}} \, \alpha = \sqrt{\frac{E\{|x_{Data}|^2\}}{E\{|x_{Pilot}|^2\}}} \quad (3)$$

In Equation (3), E{ } denotes an average value, $x_{Pilot}$ denotes a pilot transmission part of a transmission signal, and $x_{Data}$ denotes a data transmission part of the transmission signal. For example, as a value of α becomes closer to "1" in Equation (3), it may be determined that the NC performance is the best.

The value of α may be replaced by the difference value between the amplitudes of the pilot transmission part and the data transmission part as shown in Equation (4), as well as the ratio of amplitudes between the pilot transmission part and the data transmission part as shown in Equation (3). For example, when a value of α in Equation (4) is smaller than a specific value, NC performance may be determined to be good. For another example, the NC performance may be determined to be good as the value of α becomes smaller. Alternatively, as shown in Equation (5), a value of α may be expressed as an element of power instead of the amplitude.

$$\alpha = E\{|x_{Pilot}|^2\} - E\{|x_{Data}|^2\} \text{ or} \quad (4)$$
$$\alpha = E\{|x_{Data}|^2\} - E\{|x_{Pilot}|^2\} \text{ or}$$
$$\alpha = (E\{|x_{Pilot}|^2\})[dB] - \left(\sqrt{E\{|x_{Data}|^2\}}\right)[dB] \text{ or}$$
$$\alpha = (E\{|x_{Data}|^2\})[dB] - (E\{|x_{Pilot}|^2\})[dB]$$

$$\alpha = \frac{E\{|x_{Pilot}|^2\}}{E\{|x_{Data}|^2\}} \text{ or } \alpha = \frac{E\{|x_{Data}|^2\}}{E\{|x_{Pilot}|^2\}} \quad (5)$$

The transmission node may change the amplitude of the pilot transmission part of the transmission signal by utilizing α. Here, in case that additional power allocation is possible in the transmission node, only the power of the pilot transmission part may be changed by reflecting a value of α while maintaining the power of the data transmission part of the transmission signal. In other words, the pilot transmission part of the transmission signal may be transmitted with power multiplied by α.

However, when the available power of the transmission node is limited, additional consideration is required for power allocation of the pilot transmission part and the data transmission part of the transmission signal. For example, when the transmission power per slot needs to be kept constant, the transmission power per slot may be kept constant by reducing the power of the data transmission part of the transmission signal as much as the power of the pilot transmission part of the transmission signal increases. A normalization factor β for the power allocation may be expressed as in Equation (6) by considering transmission power of resources for pilot and data transmissions.

$$\beta = \sqrt{\frac{P_{Pilot}^{RE} + P_{Data}^{RE}}{\alpha^2 P_{Pilot}^{RE} + P_{Data}^{RE}}} \quad (6)$$

In Equation (6), $P_{Pilot}^{RE}$ denotes the transmission power of resource elements (REs) for transmitting pilots (i.e., RS) in a slot, and $P_{data}^{RE}$ denotes the transmission power of REs for transmitting data in a slot.

The pilot transmission part of the transmission signal may be transmitted with power multiplied by αβ (i.e., α×β), and the data transmission part may be transmitted with power multiplied by β.

The reception node may perform the NC and channel estimation by considering "α" reported from the transmission node. The reporting frequency of α may be variously configured according to transmission data and PA characteristics. In this case, when channel estimation is performed in units of slots, α may need to be reported in each slot. Alternatively, the reporting frequency may be variously configured according to transmission data and PA characteristics.

For example, a may be reported in a manner of configuring a table through quantization considering an appropriate range according to the number of available bits and transmitting a corresponding specific index. For example, when α is reported as 2 bits, the candidate range of a value of α may be divided into 4 candidate ranges through quantization, and an index corresponding to a specific candidate range among the 4 candidate ranges may be reported.

FIG. 4 illustrates an operation flowchart of a transmission node configured to perform power control of a pilot part in order to compensate for the nonlinearity of PA according to an embodiment.

The transmission node may generate a time domain (TD) signal at S410). The signal may include a pilot part and a data part.

By considering compatibility with the existing system, the transmission node may transmit a flag for reporting whether or not the method disclosed herein is applied, to a reception node at S420. For example, (i) when the NC method is applied, flag=1 may be reported, and (ii) when the existing NC method is applied, flag=0 may or may not be reported. For example, the operation of transmitting the flag may be performed in an initial link setup process between the transmission node and the reception node. In addition, when the transmission node and the reception node mutually know that the NC method is applied, the operation of transmitting the flag may be omitted.

Hereinafter, description will be made by assuming that the NC method provided herein is applied.

The transmission node may determine whether a transmission power can be increased at S430.

When the transmission power can be increased in the transmission node at S430, the power of the data transmission part of the transmission signal may be maintained and only the pilot transmission part may reflect the amplitude change according to a value of a at S441.

Since the method is to enable the reception node to accurately identify the nonlinearity of a PA, it is required to select a value of α causing the distribution characteristics of a pilot transmission part of a transmission signal to be used for acquisition of PA input/output relationship information and a data transmission part of the transmission signal, for which the nonlinearity is compensated for by using the acquired information, to be similar.

'α' may be selected based on the above Equations (1) to (5) and related descriptions thereof. For example, it is possible to compare the peak values of the pilot transmission part and the data transmission part of the transmission signal and select α causing the peak values to be similar. Alternatively, based on the probability density function (PDF) of the amplitude, a value of α causing the distributions between the pilot transmission part and the data transmission part to be most similar may be selected. Alternatively, based on the PDF of the amplitude, a value of α causing the distributions of upper values to be most similar may be selected. That is, α that minimizes the difference between the distributions of the upper X % (0<X<=100) based on the amplitude of the pilot transmission part and the data transmission part may be selected. Alternatively, in case that the transmission node has sufficient computational capability, α with the best performance can be selected when NC is performed by applying all possible a values.

For example, a may be reported in a manner of configuring a table through quantization considering an appropriate range according to the number of available bits and transmitting a corresponding specific index.

In case that the transmission node fails to increase the transmission power at S430, the transmission node may perform normalization, in which the amplitude of the data transmission part is also changed according to the change in the amplitude of the pilot transmission part so that the transmission power per slot can be kept constant at S442. Here, since normalization factor β for maintaining transmission power per slot does not change the amplitude ratio of the pilot and data transmission parts, the normalization factor β may not be separately reported to the reception node.

The transmission node may transmit a transmission TD signal including the pilot and data parts to the reception node at S450. For example, the transmission signal may be transmitted through a physical channel. In addition, the transmission node may transmit information indicating the amplitude scaling factor to the reception node. For example, when the transmission power of the transmission node is able to be increased, the power determined based on the amplitude scaling factor may be applied to the pilot part (e.g., the pilot part may be transmitted after being increased by α times). When the transmission power of the transmission node is unable to be increased, the power determined based on the amplitude scaling factor and the normalization factor may be applied to the pilot part, and the power determined based on the normalization factor may be applied to the data part (e.g., the pilot part after being increased by αβ times, data part after being increased by β times).

Figure 5:
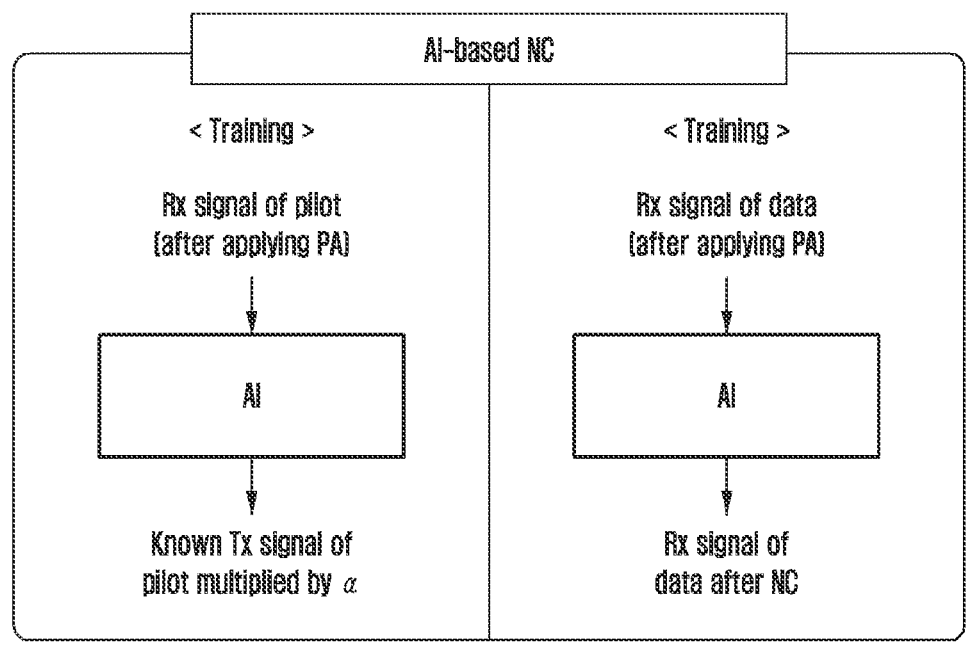
FIG. 5 illustrates AI training and inference when performing AI-based NC technology in a reception node according to an embodiment.
Figure 6:
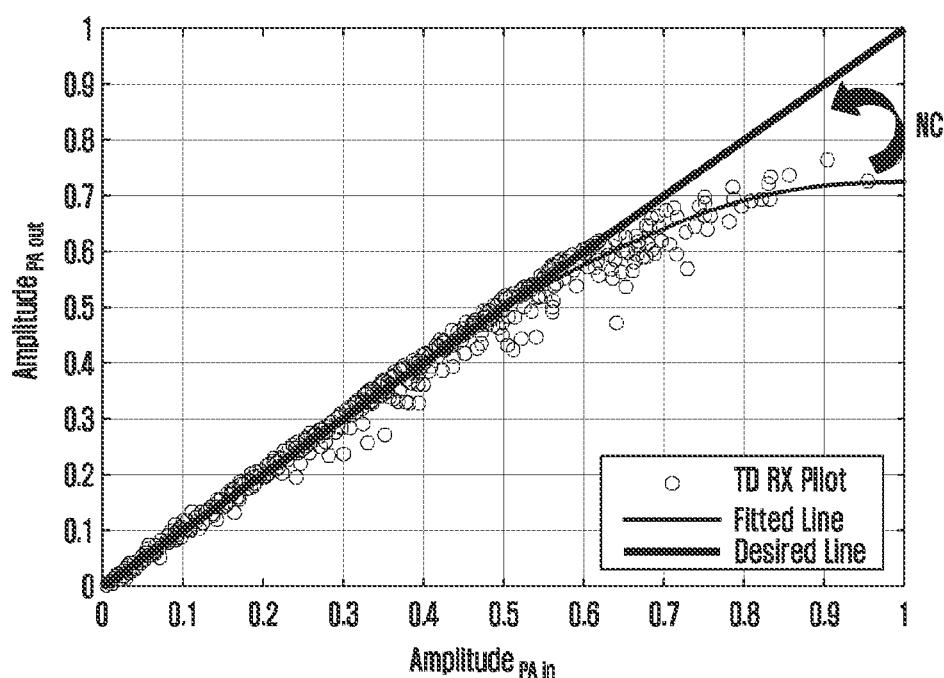
FIG. 6 illustrates an example of an NC effect when performing non-AI-based NC technology in a reception node.

With reference to FIGS. 5 and 6, the operation of a reception node having received a signal and an amplitude scaling factor from a transmission node will be described in detail.

FIG. 5 illustrates artificial intelligence (AI) training and inference when performing AI-based NC technology in a reception node according to an embodiment.

First, AI training to compensate for the nonlinearity of a PA may be performed by putting a pilot part of a received signal affected by the nonlinearity of the PA while passing through the PA into an input layer of the AI in a transmission node, and putting the pilot part that can be known in advance (for example, a pilot signal may be predefined or preconfigured in common for the transmission node and the reception node) into an output layer of the AI in the reception node. Here, by considering that the transmission node has changed the amplitudes of the pilot transmission part and the data transmission part of the transmission signal, a signal obtained by multiplying the pilot of the transmission signal previously known in the reception node by a may be put into the output layer of the reception node.

In the case of putting a data transmission part of the actually received signal into the input layer of the trained AI model, the data transmission part of the received signal for which nonlinearity is compensated for through AI inference may be obtained. For example, when DMRS is used as a pilot for NC technology, DMRS should be divided by a after NC is performed in the reception node so that DMRS is able to be used for a previously designated separate use such as channel estimation.

FIG. 6 illustrates an NC effect when a non-AI-based NC technology is performed in a reception node. When performing non-AI-based NC technology, the PA input/output relationship may be expressed and a fitted line may be derived by utilizing a pilot part of a received signal and a pilot part of a transmission signal which is able to be known in advance by the reception node. Based on the relationship and fitted line, NC technology can be performed without the application of AI.

Figure 7:
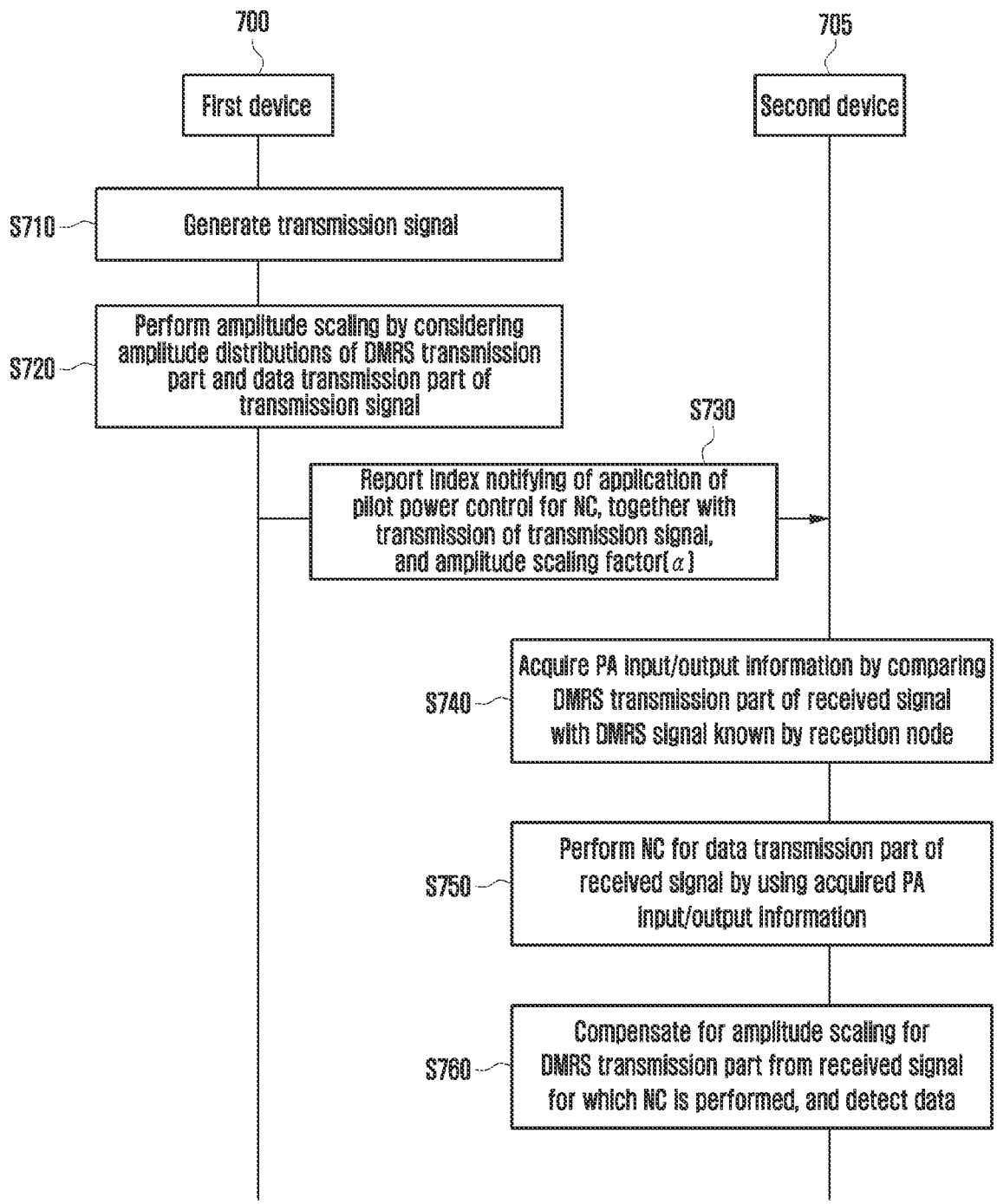
FIG. 7 illustrates an operating procedure of NC technology using DMRS when transmission power can be increased in a first device according to an embodiment.
Figure 8:
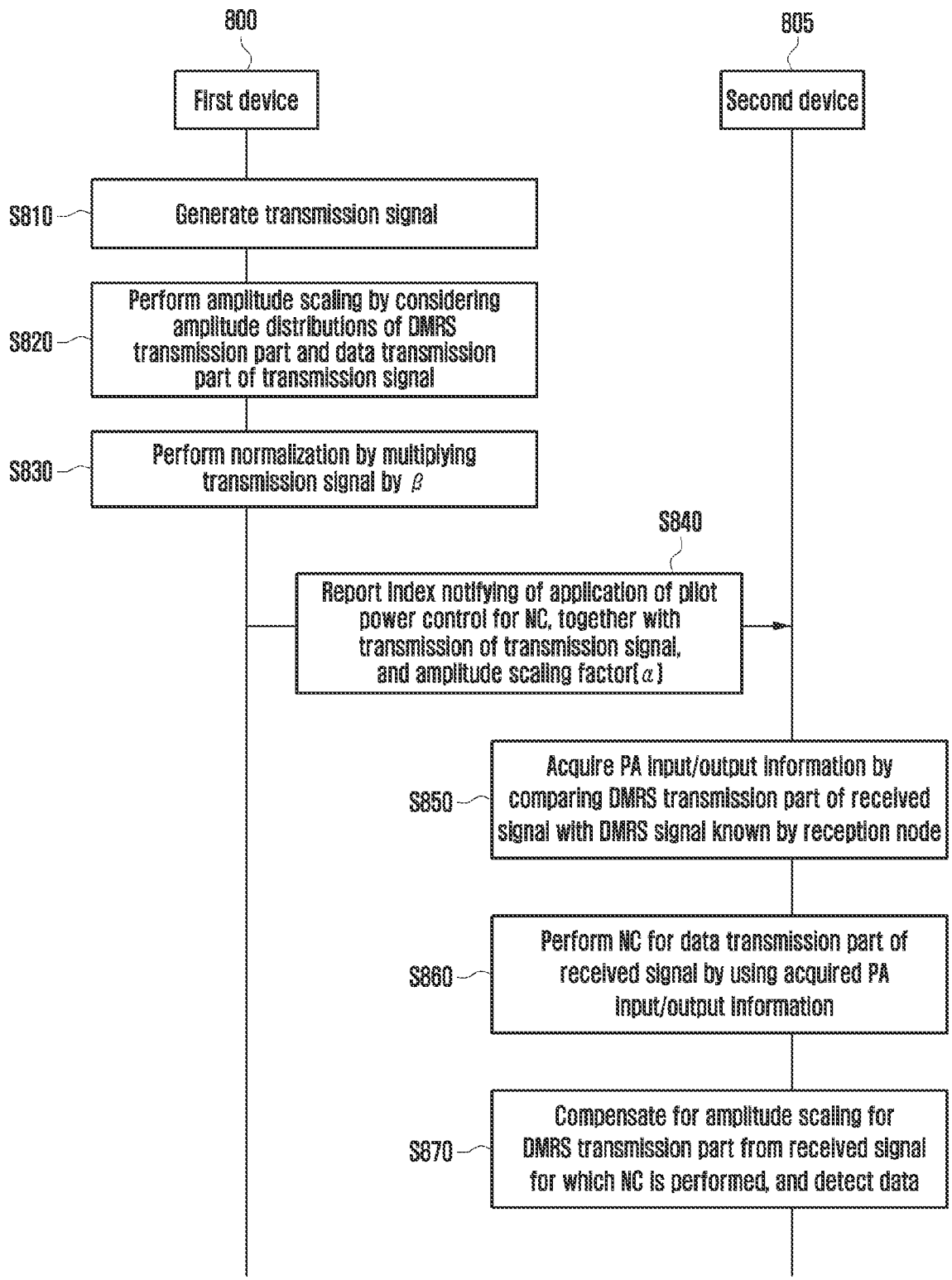
FIG. 8 illustrates the operation of NC technology using DMRS when additional transmission power allocation is limited according to an embodiment.
Figure 9:
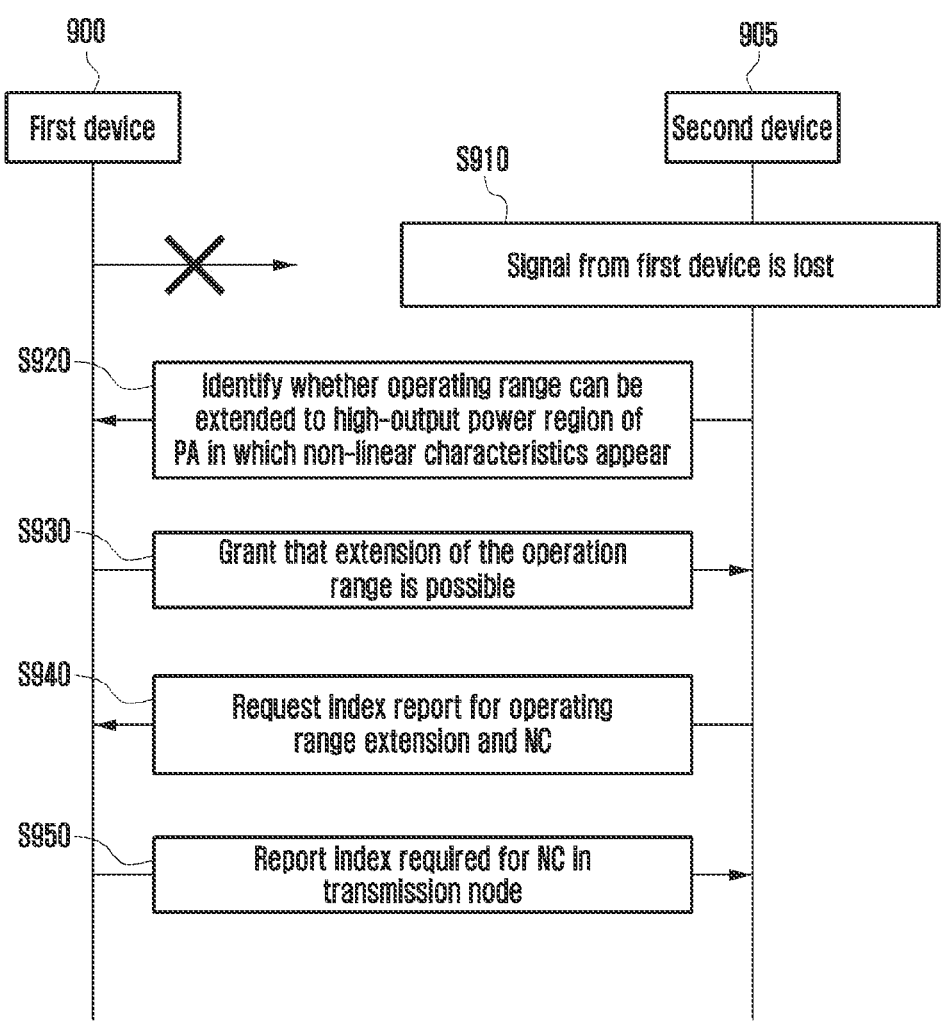
FIG. 9 illustrates signaling for identifying applicability of PA NC technology of a transmission node according to an embodiment.
Figure 19:
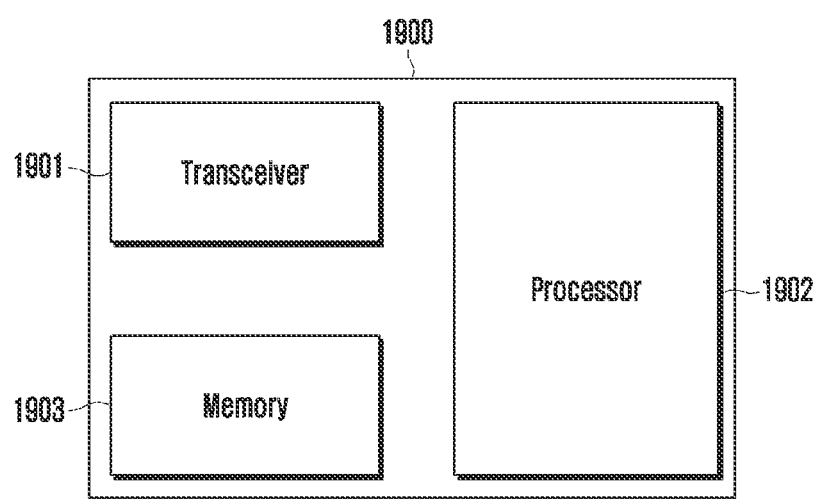
FIG. 19 is a block diagram of a terminal according to an embodiment.
Figure 20:
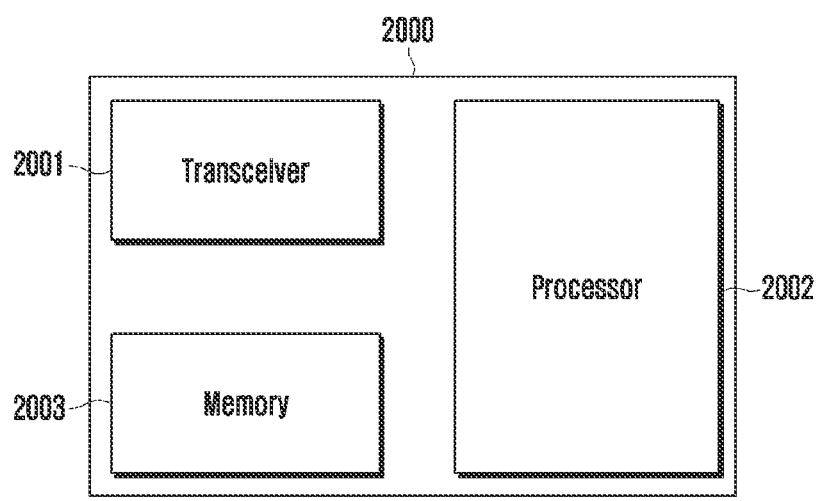
FIG. 20 is a block diagram of a BS according to an embodiment.
Figure 21:
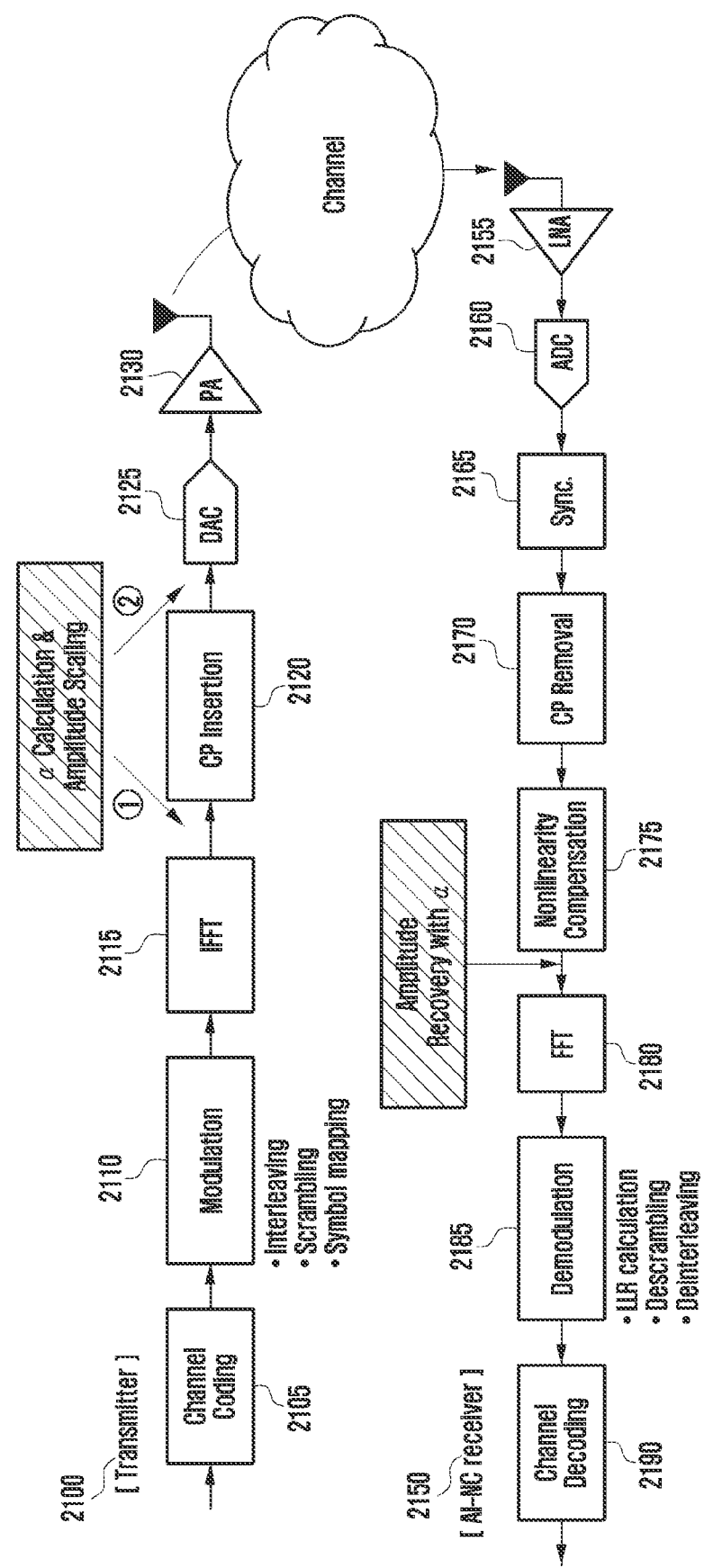
FIG. 21 illustrates a transmission path of a transmitter and a reception path of a receiver according to an embodiment.

FIGS. 7 to 9 describe signaling procedures between a first device and a second device according to an embodiment and/or a method disclosed herein. In FIGS. 7 to 9, the first device may correspond to a transmitter and the second device may correspond to a receiver. Alternatively, a transmitter may be implemented in the first device and a receiver may be implemented in the second device. For example, in the case of uplink, the first device may be a terminal and the second device may be a BS. In the case of uplink, a signal transmitted from the first device to the second device may be transmitted through an uplink channel (e.g. physical uplink shared channel (PUSCH), physical uplink control channel (PUCCH), etc.). On the other hand, in the case of downlink, the first device may be a BS and the second device may be a terminal. In addition, in the case of downlink, a signal transmitted from the first device to the second device may be transmitted through a downlink channel (e.g., physical downlink shared channel (PDSCH), physical downlink control channel (PDCCH), etc.). For example, the first device and the second device may be implemented as shown in the devices of FIGS. 19 to 21, to be described later.

FIG. 7 illustrates an operating procedure of NC technology using DMRS when transmission power can be increased in a first device according to an embodiment.

A first device 700 may generate a signal to be transmitted to a second device 705 at S710. For example, the signal may include a pilot transmission part and a data transmission part. That is, a resource region to which the signal is to be transmitted may include first time-frequency resource(s) to which a pilot is mapped and second time-frequency resource(s) to which data is mapped.

The first device may perform amplitude scaling for satisfying a specific metric by comparing the amplitude distributions of a DMRS transmission part and a data transmission part of the generated signal (e.g., a value that minimizes the difference between the two amplitude distributions) at S720. For example, by comparing the amplitude distributions of the first time-frequency resource(s) to which the pilot is mapped and the second time-frequency resource(s) to which the data is mapped, amplitude scaling factor α satisfying a specific metric may be derived, and the derived α may be reflected to increase the amplitude of the pilot part by α times.

As a specific example, the first device may multiply a pilot (e.g., DMRS) by candidate values of amplitude scaling factors to determine the amplitude distribution of the pilot signal corresponding to each candidate value, and may select, as the amplitude scaling factor, a candidate value for which a difference between a peak value of the amplitude distribution of the pilot signal corresponding to each candidate value and a peak value of the amplitude distribution of the data signal is smaller than a specific value.

The first device may transmit the generated signal to the second device at S730. For example, in the case of uplink, the signal may be transmitted through an uplink channel (e.g., PUSCH or PUCCH). In the case of downlink, the signal can be transmitted through a downlink channel (e.g., PDSCH or PDCCH). For example, a pilot may be transmitted with a power determined based on the amplitude scaling factor. Here, the first device may transmit information on the amplitude scaling factor α to the second device. For example, the first device may report information on the amplitude scaling factor together with an index corresponding to the amplitude scaling factor to the second device, and accordingly, may notify the second device that the amplitude of the DMRS has changed. For example, α may be reported in a manner such that a table is configured through quantization considering an appropriate range according to the number of available bits and a corresponding specific index is transmitted. As another example, the first device may transmit the value of the amplitude scaling factor α to the second device.

The second device may acquire PA input/output relationship information by comparing the DMRS transmission part of the received signal with a previously known DMRS signal at S740. For example, the second device may acquire the PA input/output relationship information by comparing a DMRS actually received from the first device with a signal obtained by applying (multiplying) an amplitude scaling factor to (by) a previously known DMRS signal.

The second device may perform NC for the data transmission part by utilizing the acquired PA input/output relationship information at S750. That is, power compensation can be performed for the data transmission part. The second device may acquire a signal in which amplitude scaling is applied to the DMRS transmission part, and may divide the DMRS transmission part by α to compensate for amplitude scaling in the transmission node and then detect data through a reception process so as to finally perform channel estimation which is the original purpose of the DMRS at S760.

FIG. 8 illustrates the operation of NC technology using DMRS when additional transmission power allocation is limited according to an embodiment.

A first device 800 may generate a signal to be transmitted to a second device 805 at S810. For example, the signal may include a pilot transmission part and a data transmission part. That is, a resource region to which the signal is to be transmitted may include first time-frequency resource(s) to which pilot is mapped and second time-frequency resource(s) to which data is mapped.

The first device may perform amplitude scaling for satisfying a specific metric by comparing the amplitude distributions of the DMRS transmission part and the data transmission part of the generated signal (e.g., a value that minimizes the difference between the two distributions) at S820. For example, the first device may derive an amplitude scaling factor α that satisfies the specific metric by comparing amplitude distributions of the first time-frequency resource(s) to which the pilot is mapped and the second time-frequency resource(s) to which the data is mapped.

Since the transmission power that can be allocated by a transmission node is fixed, when the amplitude of the DMRS transmission part of the transmission signal is increased by amplitude scaling, a normalization process of reducing the amplitude of the data transmission part to keep the average transmission power to be constant may be performed at S830. Since the normalization process is performed on the entire transmission signal, the amplitude ratio between the pilot transmission part and the data transmission part of the transmission signal may not be affected therefrom, and thus there is no need to separately report the normalization process to the BS. The normalization process may be performed based on Equation (6) above.

The first device may transmit the generated signal to a second device at S840. For example, in the case of uplink, the signal may be transmitted through an uplink channel (e.g., PUSCH or PUCCH). In the case of downlink, the signal may be transmitted through a downlink channel (e.g., PDSCH or PDCCH). For example, αβ times-multiplied amplitude scaling may be applied to the pilot transmission part, and β times-multiplied amplitude scaling may be applied to the data transmission part. In this case, information about the amplitude scaling factor α may be reported to the second device. For example, an index corresponding to an amplitude scaling factor may be transmitted to the second device, and accordingly, the second device may be notified that the amplitude of the DMRS has changed. α can be reported in a manner such that a table is configured through quantization considering an appropriate range according to the number of available bits, and a corresponding specific index is transmitted. As another example, the value of the amplitude scaling factor α may be transmitted to the second device.

The second device may acquire PA input/output relationship information by comparing a DMRS transmission part of a received signal with a known DMRS signal at S850.

The second device may perform NC for the data transmission part by utilizing the acquired PA input/output relationship information at S860. That is, power compensation can be performed for the data transmission part. The second device may acquire a signal in which amplitude scaling is applied to the DMRS transmission part, and may divide the DMRS transmission part by a to compensate for amplitude scaling in the transmission node and then detect data through a reception process so as to finally perform channel estimation which is the original purpose of the DMRS at S870.

It is needless to say that the method described in FIGS. 7 and 8 can be applied not only to an example in which a UE transmits an uplink signal to a BS, but also to a DL through which the BS transmits a signal to the UE.

In addition, other types of RS such as PSS, SSS, SRS, and CSI-RS may be used as pilots instead of DMRS in order to acquisition of PA input/output information.

FIG. 9 illustrates signaling for identifying applicability of PA NC technology of a transmission node according to an embodiment.

Due to reasons such as a first device 900 being out of coverage, a second device 905 may not be able to receive a signal transmitted from the first device at S910. In case that the signal reception has failed, the second device may identify whether it is possible for the first device to extend the operating range to the high-output power region of the PA by reducing the back-off at S920. To this end, the second device may transmit a back-off reduction request message to the first device. The first device may notify the second device whether extension of the operation range is possible at S930. For example, in response to the request message, the first device may transmit whether back-off reduction is possible to the second device. In case that extension of the operating range is possible in the first device, the second device may request the first device to extend the operating range at S940.

The first device may perform amplitude scaling to improve NC performance while extending an operating range and report an index corresponding to the amplitude scaling together with the transmission signal at S950. The NC may be performed in the second device.

In another embodiment, when the second device 905 has failed to receive a signal transmitted from the first device at S910, the second device may request the first device to extend the operating range of the PA by reducing the back-off. When the first device can extend the operating range, the first device may perform amplitude scaling for NC performance improvement while extending the operating range, and may transmit an index corresponding to the amplitude scaling factor to the second device together with a transmission signal at S950. When the first device has failed to extend the operating range, the first device may notify the second device that the operating range extension is not possible.

The process of FIG. 9 described above is applicable to downlink as well as uplink. In addition, the process of identifying the possibility of extending the operating range and requesting extension or suspension thereof may be performed statically or may be performed at various frequencies depending on circumstances.

Hereinafter, a method of reporting the amplitude scaling factor α will be described in detail. The operation process of the technology for compensating for the nonlinearity of an amplifier according to the frequency of reporting a may be as follows.

Figure 10:
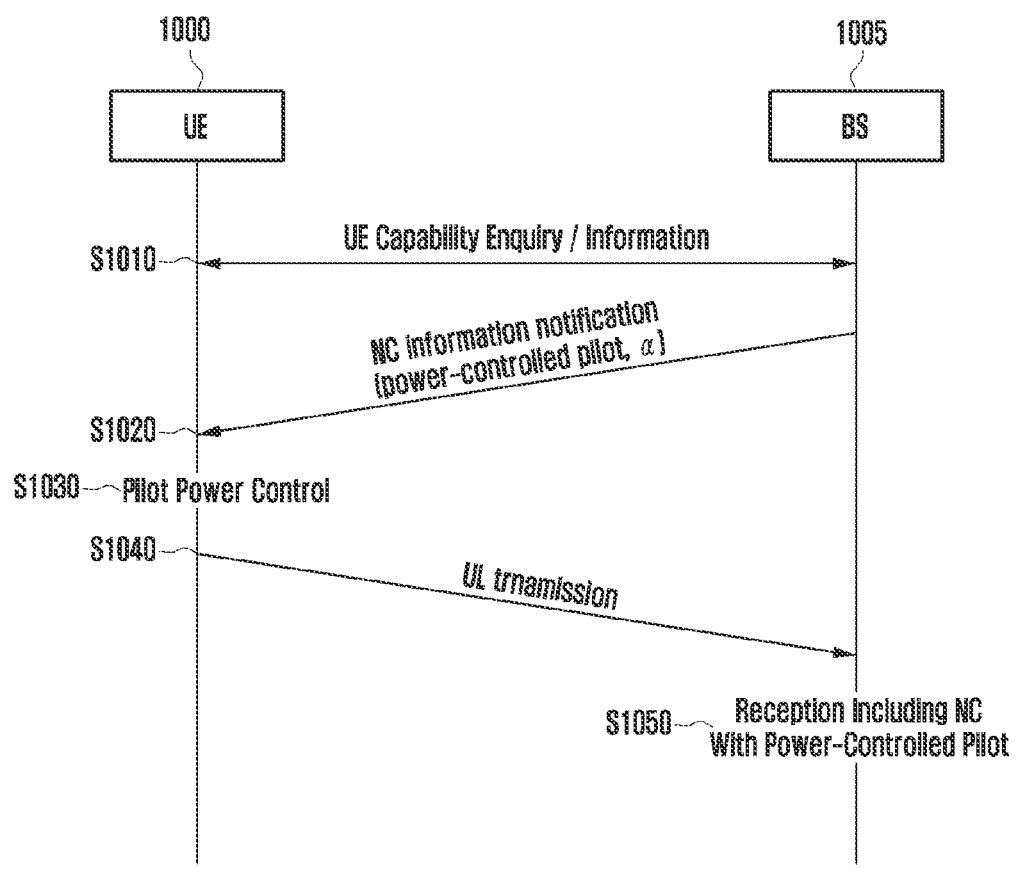
FIG. 10 illustrates semi-static operation in UL according to an embodiment.

FIG. 10 illustrates semi-static operation in UL according to an embodiment.

Capability information regarding whether a UE can support the PA NC and pilot power control technology may be requested and/or reported between a UE 1000 and a BS 1005 at S1010.

When the UE can support the PA NC and pilot power control technology, the BS may transmit a notification message including α and the type of RS (i.e., pilot) to be used for acquisition of PA input/output information among various RSs to the UE at S1020. In this case, a value of α may be selected by considering resources to be scheduled from the BS to the UE and a modulation and coding scheme (MCS) (e.g., number of resource blocks or modulation order). For example, the notification message may be delivered through a radio resource control (RRC) message, a medium access control (MAC) control element (MAC CE), downlink control information (DCI), and the like.

The UE may perform pilot power control based on the received notification message at S1030 and transmit a UL signal to the BS at S1040. The BS may perform a reception process considering pilot power control at S1050. Operations S1030 to S1050 may be performed according to the method described in FIGS. 4, 5, 7, and/or 8 described above.

Figure 11:
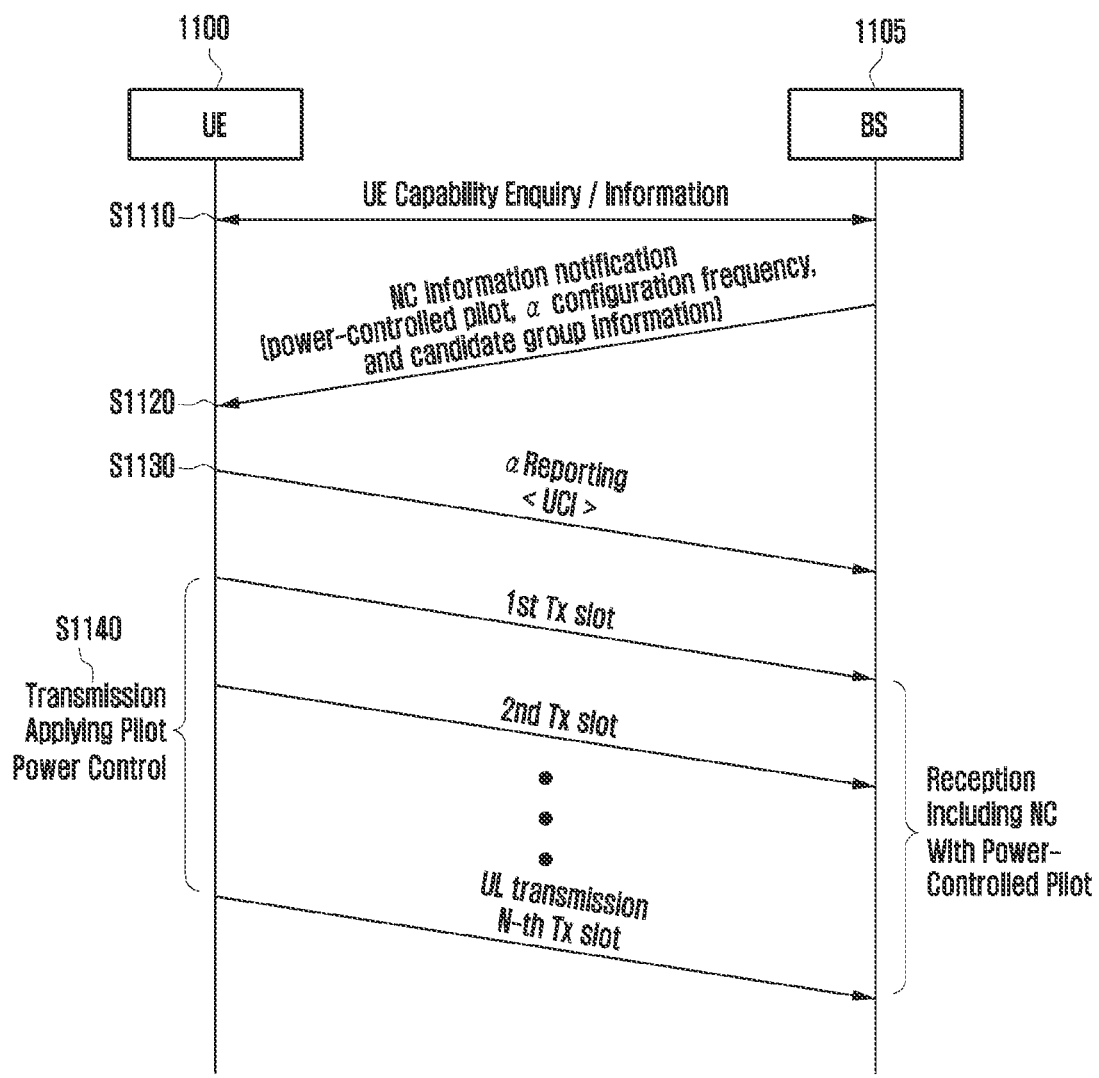
FIG. 11 illustrates a signaling procedure for dynamically reporting an amplitude scaling factor in UL according to an embodiment.

FIG. 11 illustrates a signaling procedure for dynamically reporting an amplitude scaling factor in UL according to an embodiment.

Capability information regarding whether a UE can support the PA NC and pilot power control technology may be requested and/or reported between a UE 1100 and a BS 1105 at S1110.

The BS may notify the UE of NC-related configuration information (e.g., a notification message) at S1120. For example, the NC-related configuration information may include the type of RS (pilot) to be used for acquisition of PA input/output information, a configuration frequency, a candidate group information, and the like. For example, the NC-related configuration information may be transmitted through RRC signaling, MAC CE signaling, and/or DCI.

The UE may perform pilot power control based on the received NC-related configuration information and determine a value of amplitude scaling factor α. The UE may report the determined α value to the BS at S1130. Separate uplink control information (UCI) may be defined for the reporting of α value. That is, α may be reported to the BS through UCI included in a PUCCH.

The BS may apply NC based on a to signals received after receiving the UCI including α at S1140. For example, α may be applied to all signals received before a new α is received. Alternatively, the signal range to which α is applied may be transmitted together with a value of α. For example, α may be reported every N slots, and N may be predefined or configured by the BS.

Operations S1130 to S1140 may be performed according to the method described in FIGS. 4, 5, 7 and/or 8 described above. Therefore, redundant descriptions will be omitted.

Figure 12:
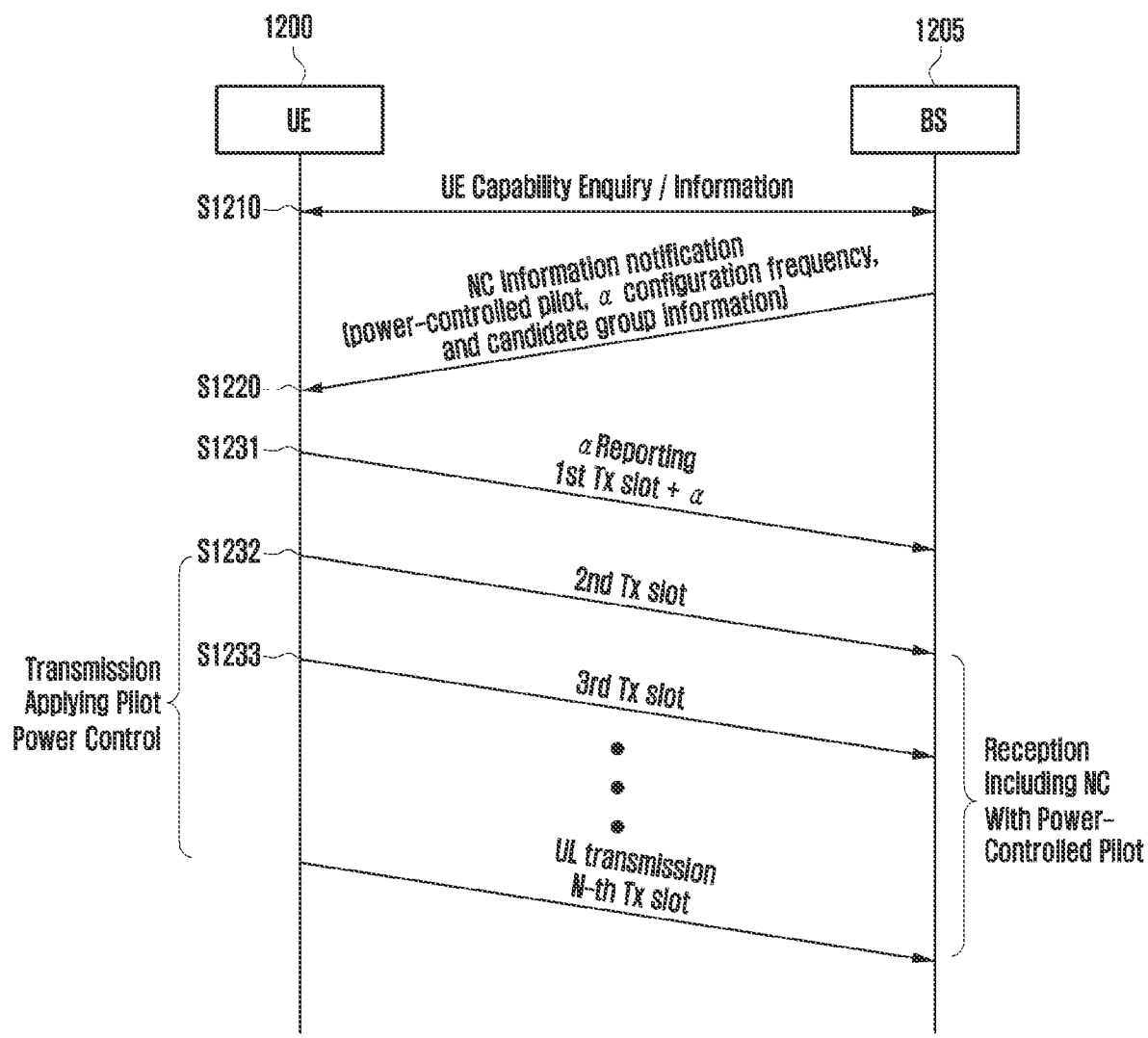
FIG. 12 illustrates a signaling procedure for dynamically reporting an amplitude scaling factor in UL according to an embodiment.

FIG. 12 illustrates a signaling procedure for dynamically reporting an amplitude scaling factor in UL.

Capability information regarding whether a UE can support the PA NC and pilot power control technology may be requested and/or reported between a UE 1200 and a BS 1205 at S1210.

The BS may notify the UE of NC-related configuration information (e.g., notification message) at S1220. For example, the NC-related configuration information may include the type of RS to be used for acquisition of PA input/output information, α configuration frequency, α candidate group information, and the like. The α candidate group information may be determined according to the number of bits allocated for reporting of a value of α. For example, the NC-related configuration information may be transmitted through RRC signaling, MAC CE signaling, and/or DCI.

The UE may perform pilot power control based on the received NC-related configuration information and determine the value of amplitude scaling factor α. The UE may report the determined α value to the BS. In this case, the α value may be reported through a PUSCH of a first slot to which the NC technology is not applied at S1231. The BS may apply NC based on a to signals received after the PUSCH of the first slot at S1232 and S1233. For example, α may be applied to all signals received before new α is received. Alternatively, the signal range to which α is applied may be transmitted together with a value of α. As an example, a may be reported every N slots, and N may be predefined or configured by the BS. Operations S1231 to S1233 may be performed according to the method described in FIGS. 4, 5, 7, and/or 8 described above. Therefore, redundant descriptions will be omitted.

Figure 13:
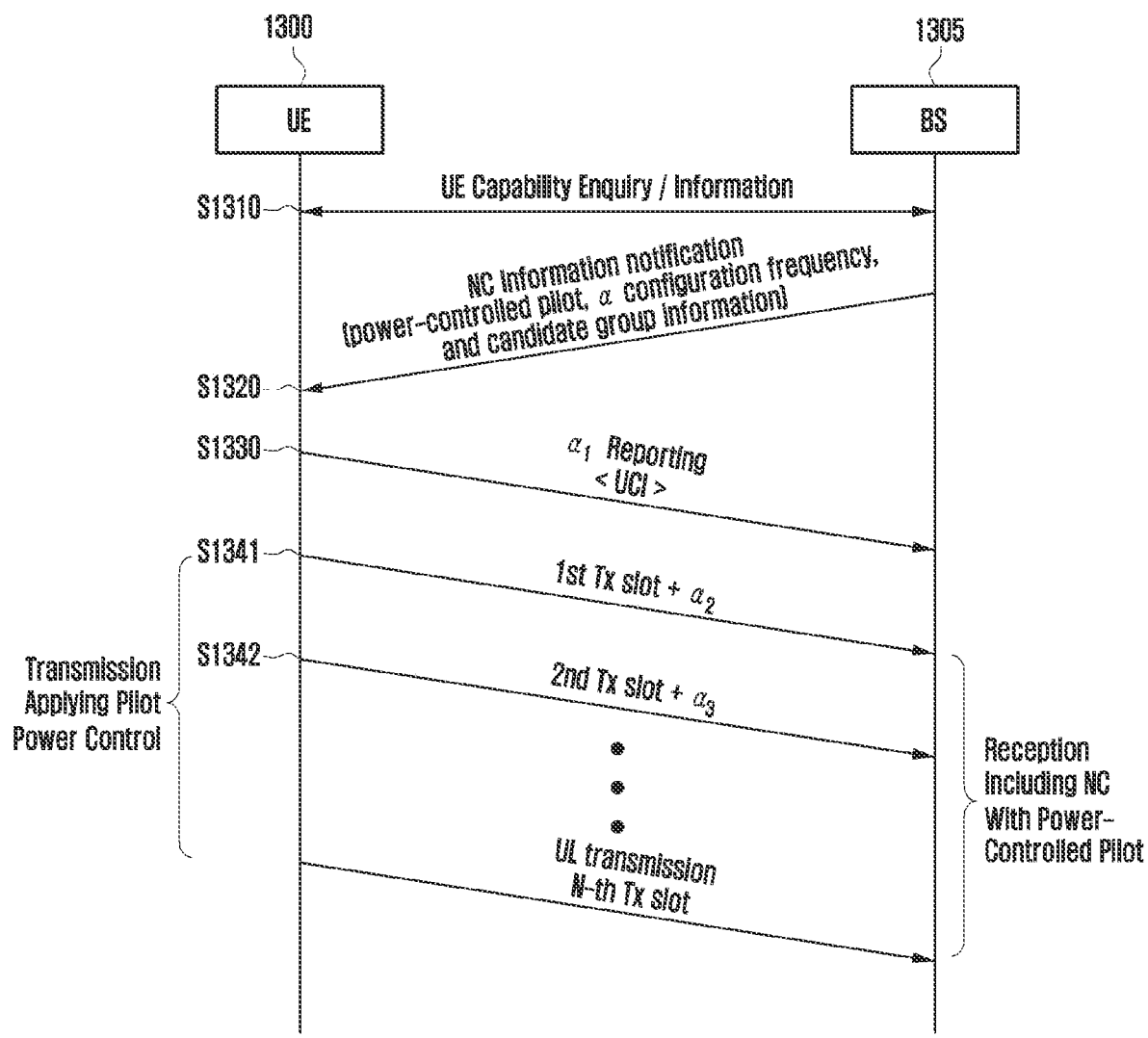
FIG. 13 illustrates a signaling procedure of reporting an amplitude scaling factor in each slot in UL according to an embodiment.
Figure 14:
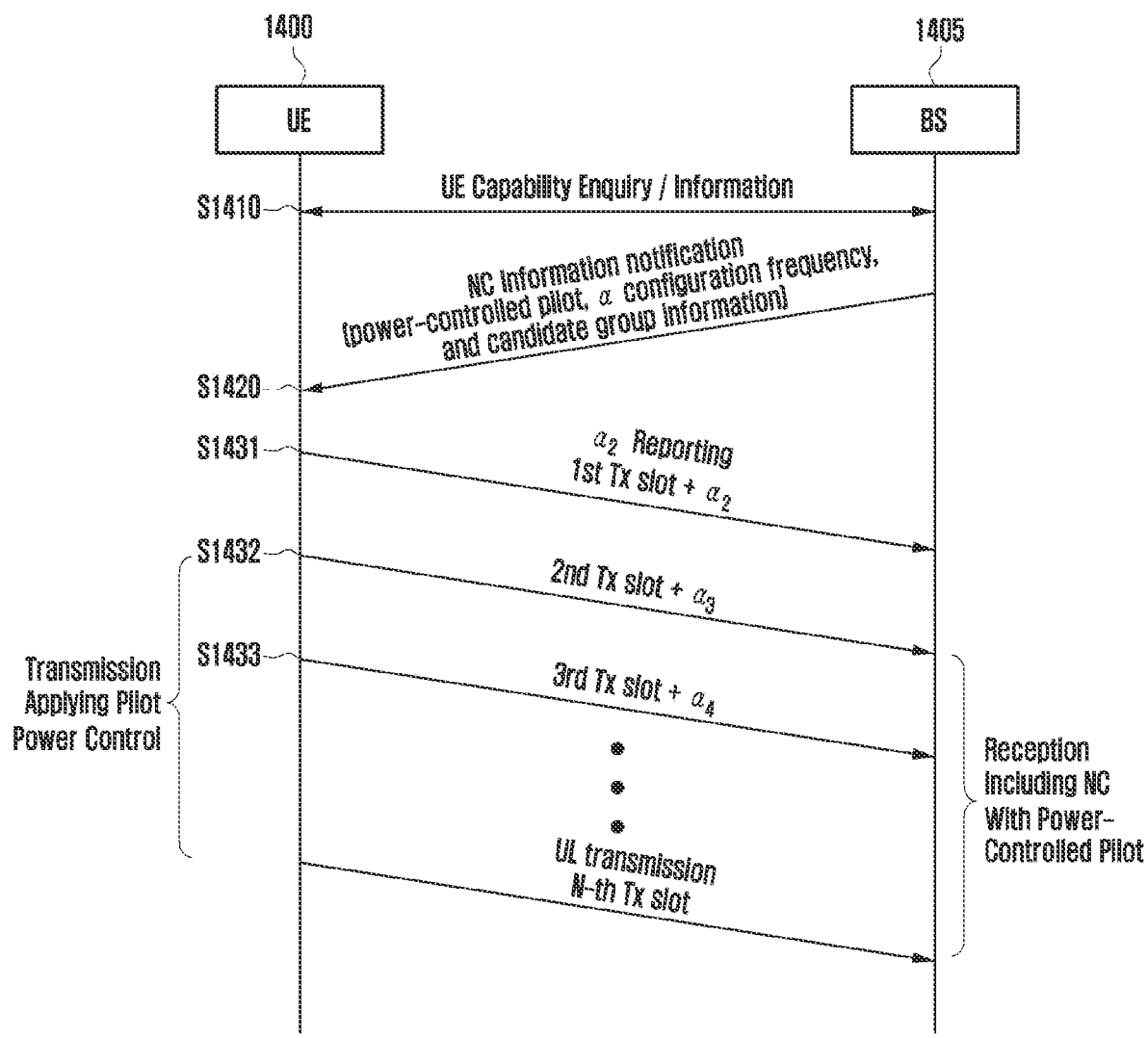
FIG. 14 illustrates a signaling procedure of reporting an amplitude scaling factor in each slot in UL according to an embodiment.

FIGS. 13 and 14 illustrate signaling procedures of reporting an amplitude scaling factor in each slot in UL according to an embodiment.

Capability information regarding whether a UE can support the PA NC and pilot power control technology may be requested and/or reported between a UE 1300 or 1400 and a BS 1305 or 1405 at S1310, S1410.

The BS may notify the UE of NC-related configuration information (e.g., notification message) at S1320, S1420. For example, the NC-related configuration information may include the type of RS to be used for acquisition of PA input/output information, α configuration frequency, α candidate group information, and the like. The α candidate group information may be determined according to the number of bits allocated for reporting of a value of α. For example, the NC-related configuration information may be transmitted through RRC signaling, MAC CE signaling, and/or DCI.

The UE may perform pilot power control based on the received NC-related configuration information and determine the value of amplitude scaling factor α. The UE may report the determined α value to the BS.

Referring to FIG. 13, separate uplink control information (UCI) may be defined for reporting of the α value. That is, α value may be reported to the BS through the UCI included in a PUCCH. Here, the α value reported through the UCI may be a value (e.g., α_1) to be applied to a signal to be transmitted in the next slot (e.g., 1st TX slot) at S1330. In addition, a signal to be transmitted in the 1st TX slot may be transmitted, to the BS, together with a value (e.g., α_2) to be applied to a signal to be transmitted two slots later (e.g., 2nd TX slot) at S1341. In addition, a signal to be transmitted in the 2nd TX slot may be transmitted, to the BS, together with a value (e.g., α_3) to be applied to a signal to be transmitted three slots later (e.g., 3rd TX slot) at S1342. That is, the value of α to be applied to the next slot may be reported in each slot.

Referring to FIG. 14, the value (e.g., α_2) to be applied to the PUSCH of the second slot may be reported, together with the PUSCH of the first slot to which the NC technology is not applied, to the BS at S1431. The value (e.g., α_3) to be applied to the PUSCH of the third slot may be reported, together with the PUSCH of the second slot, to the BS at S1432. The value (e.g., α_4) to be applied to the PUSCH of the fourth slot may be reported, together with the PUSCH of the third slot, to the BS at S1433.

In FIGS. 13 and 14, the operations of determining the amplitude scaling factor, and performing power compensation for a received signal in the reception node may be performed according to the method described in FIGS. 4, 5, 7, and/or 8. Therefore, redundant descriptions will be omitted.

Figure 15:
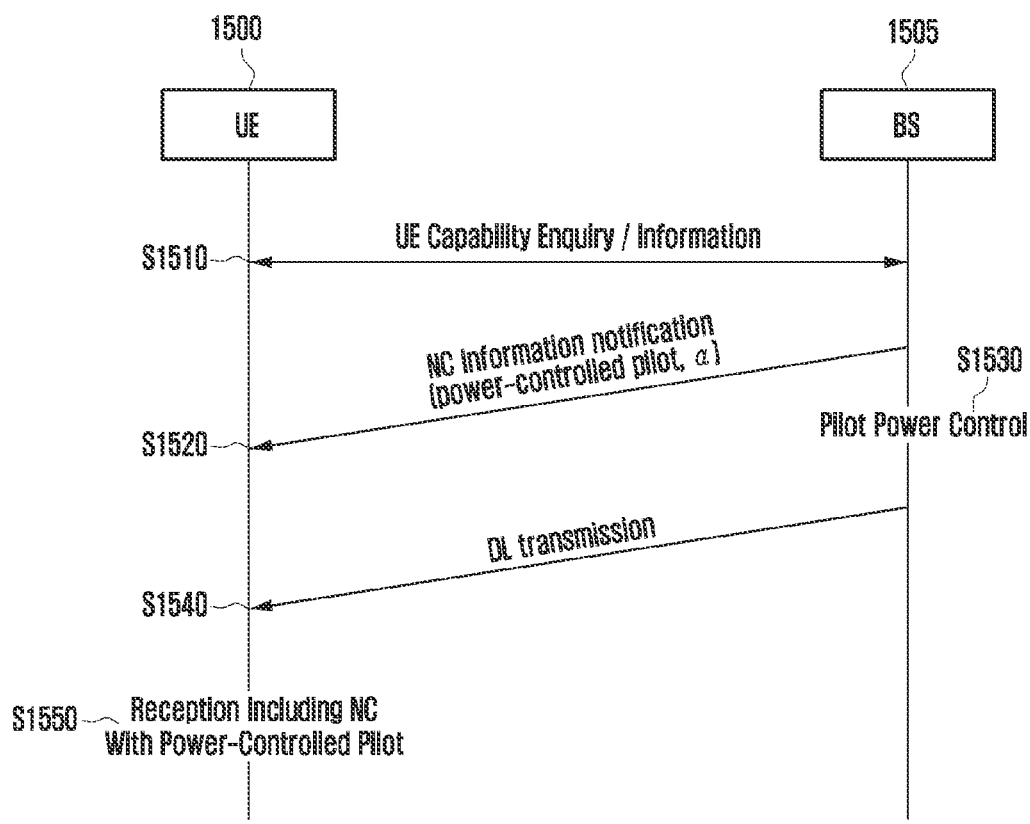
FIG. 15 illustrates signaling for reporting an amplitude scaling factor semi-statically in DL according to an embodiment.

FIG. 15 illustrates signaling for reporting an amplitude scaling factor semi-statically in DL according to an embodiment.

Capability information regarding whether a UE can support the PA NC and pilot power control technology may be requested and/or reported between a UE 1500 and a BS 1505 at S1510.

When a UE can support the PA NC and pilot power control technology, the BS may transmit a notification message including α and the type of RS to be utilized for acquisition of PA input/output information among various RSs to the UE at S1520. Here, a value of α may be selected by considering resources to be scheduled from the BS to the UE and MCS (the number of resource blocks or a modulation order), and the notification message may be transmitted through an RRC message, MAC control element (MAC CE), downlink control information (DCI), and the like.

The BS may perform pilot power control based on the notification message at S1530 and transmit a DL signal to the UE at S1540. The UE may perform a reception process considering pilot power control at S1550.

The operations of determining the amplitude scaling factor and performing power compensation for a received signal in the reception node in FIG. 15 may be performed according to the method described in FIGS. 4, 5, 7, and/or 8. Therefore, redundant descriptions will be omitted.

Figure 16:
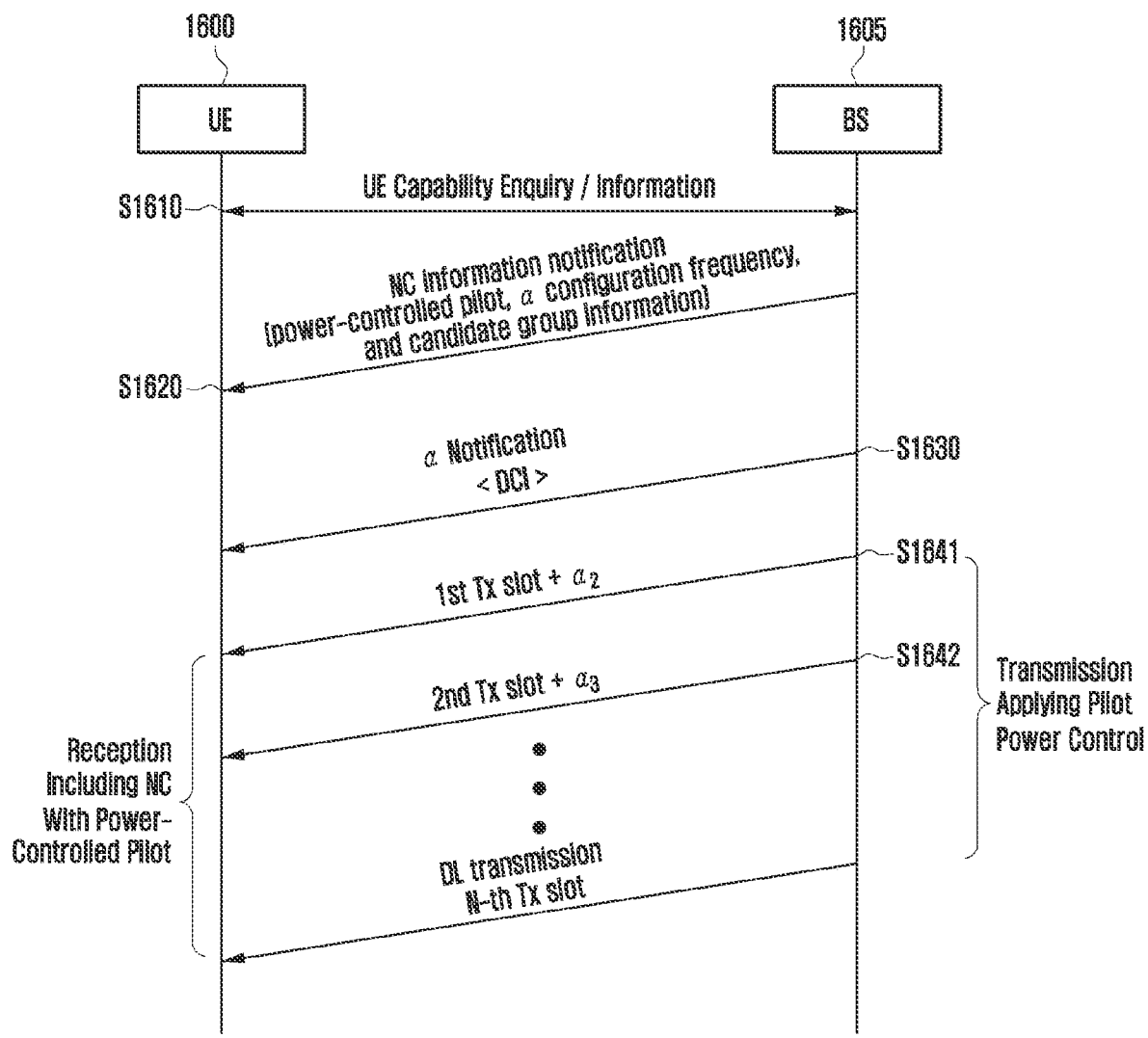
FIG. 16 illustrates signaling for dynamically reporting an amplitude scaling factor in DL according to an embodiment.
Figure 17:
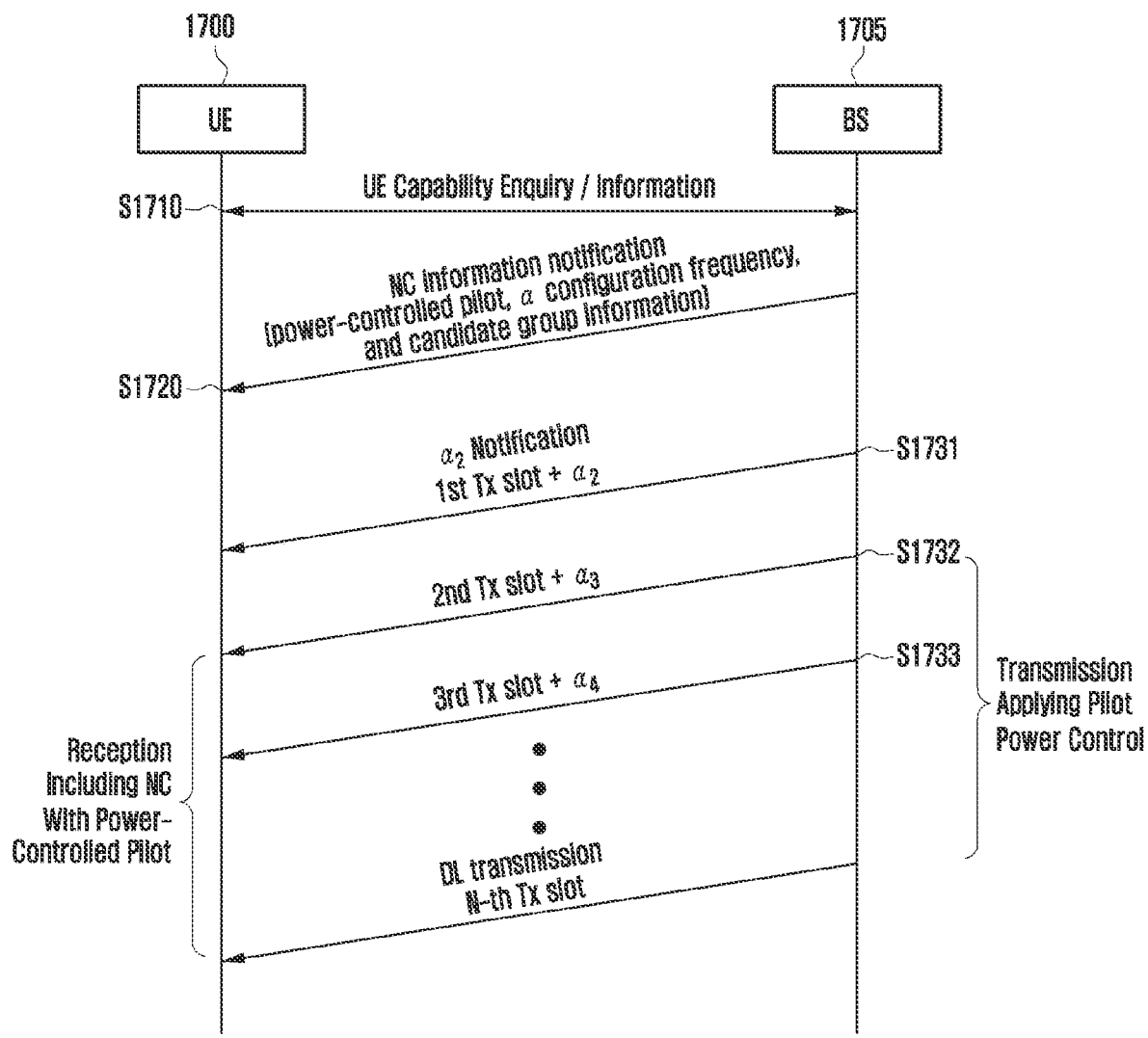
FIG. 17 illustrates signaling for dynamically reporting an amplitude scaling factor in DL according to an embodiment.

FIGS. 16 and 17 illustrate signaling for dynamically reporting an amplitude scaling factor in DL according to an embodiment.

Capability information regarding whether a UE can support the PA NC and pilot power control technology may be requested and/or reported between a UE (1600 or 1700) and a BS (1605 or 1705) at S1610, S1710.

The BS may notify the UE of NC-related configuration information (e.g., notification message) at S1620, S1720. For example, the NC-related configuration information may include the type of RS to be used for acquisition of PA input/output information, a configuration frequency, α range, and/or α candidate group information. The α candidate group information may be determined according to the number of bits allocated for reporting of a value of α. For example, the NC-related configuration information may be transmitted through RRC signaling, MAC CE signaling, and/or DCI.

Referring to FIG. 16, the BS may report a to be applied to the first slot to the UE through DCI at S1630. Thereafter, the BS may transmit a value of α to be applied to the next slot through a PDSCH to the UE in each slot. For example, the BS may transmit, to the UE, a value of α_2 to be applied to the second slot together with a DL signal in the first slot at S1641. The BS may transmit, to the UE, a value of α_3 to be applied to the third slot together with a DL signal in the second slot at S1642. The BS may transmit, to the UE, a value of α_n to be applied to the n th slot together with a DL signal in the (n−1)th slot.

Although FIG. 16 has described that an amplitude scaling factor is reported in each slot, the amplitude scaling factor transmitted through DCI may be equally applied to PDSCHs of N slots similarly to the example of FIG. 13 described above. That is, a may be reported for every N slots, and N may be predefined or configured by the BS.

Referring to FIG. 17, the value (e.g., α_2) to be applied to the PDSCH of the second slot may be transmitted to the UE, together with the PDSCH of the first slot to which the NC technology is not applied at S1731. The value (e.g., α_3) to be applied to the PDSCH of the third slot may be transmitted to the UE, together with the PDSCH of the second slot at S1732. The value (e.g., α_4) to be applied to the PDSCH of the fourth slot may be transmitted to the UE, together with the PDSCH of the third slot at S1733.

In FIGS. 16 and 17, the operations of determining the amplitude scaling factor and performing power compensation for the received signal in the reception node may be performed according to the method described in FIGS. 4, 5, 7, and/or 8. Therefore, redundant descriptions will be omitted.

According to the method disclosed herein, accurate PA input/output relationship information for the NC can be obtained through power allocation considering the distribution of the pilot transmission part and the data transmission part of a transmission signal, so as to enable NC operation to be effectively performed, thereby not only improving the data reception performance but also increasing the coverage of the existing method.

Figure 18:
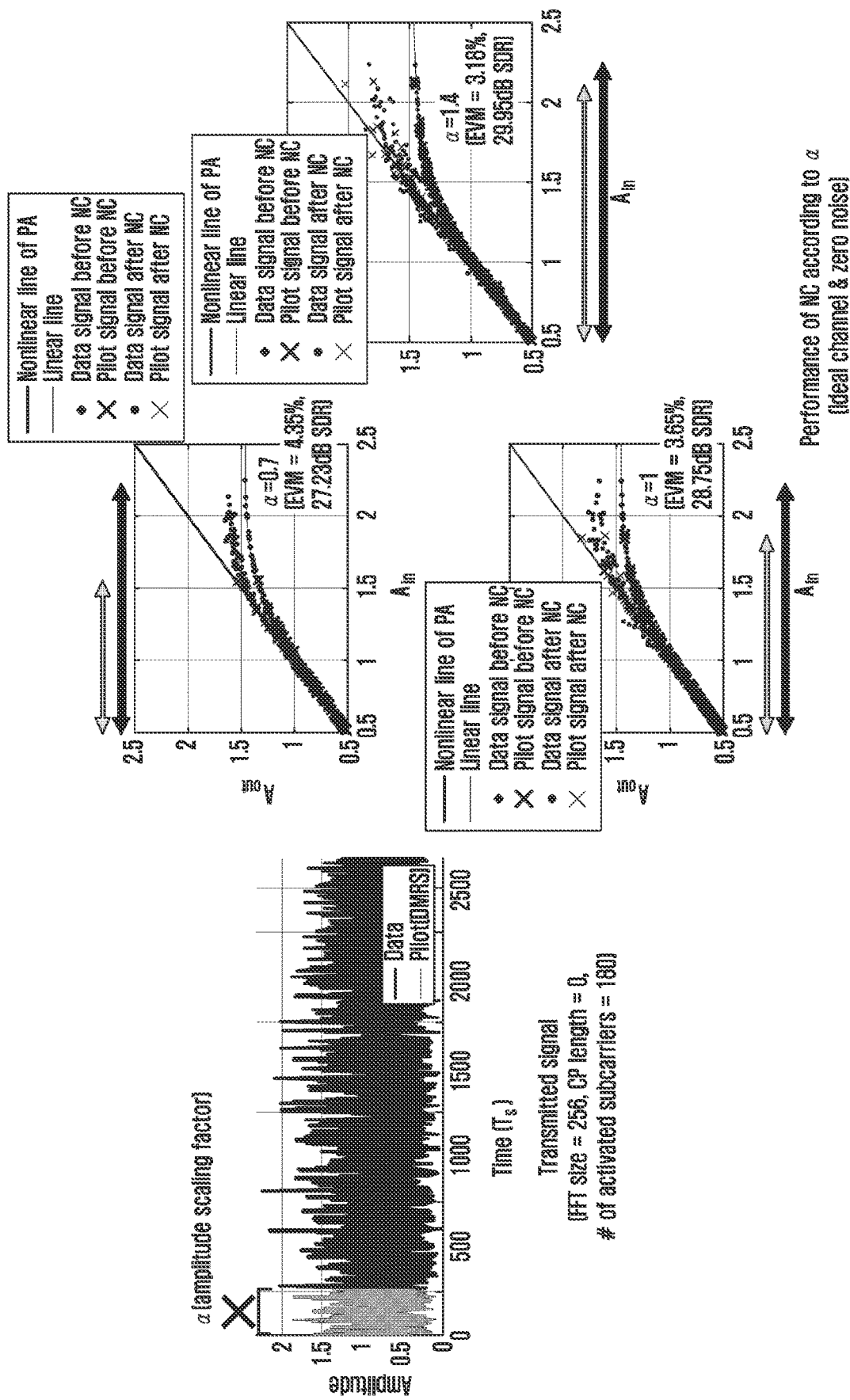
FIG. 18 illustrates performance of technology for compensating for the nonlinearity of an amplifier for each pilot power scaling factor according to an embodiment.

FIG. 18 illustrates performance of technology for compensating for the nonlinearity of an amplifier for each pilot power scaling factor according to an embodiment.

Referring to FIG. 18, in a transmission signal including a pilot transmission part and a data transmission part, when the amplitude of the pilot transmission part is changed using α, NC performance may vary depending on a value of α. In the example of FIG. 18, when a value of α, which causes the peak values of the pilot transmission part and the data transmission part to be similar, is 1.4 (α=1.4), the NC operates most effectively, and thus the signal-to-distortion ratio (SDR) due to the PA non-linearity may be the highest. The value of α (α=1.4) together with a transmission signal obtained by reflecting the SDR may be reported in a transmission node, and a reception process considering this reporting may be performed in a reception node, thereby reducing the back-off of the PA to extend coverage, and improving data reception performance.

In addition, when power control for a DMRS is performed to have a similar distribution with that of the data transmission part of the transmission signal, an effective channel including the nonlinear characteristics of the PA may have a similar influence on the pilot transmission part for channel estimation and a data symbol, and thus it is possible to estimate a channel more suitable for demodulation and to expect the effect of improving reception performance.

FIG. 19 is a block diagram of a terminal according to an embodiment.

Referring to FIG. 19, a terminal 1900 may include a transceiver 1901, a controller (processor) 1902, and a storage (memory) 1903. The transceiver 1901, the controller 1902, and the storage 1903 of the terminal 1900 may operate according to an efficient channel and signal transmission/reception method in the 5G communication system corresponding to the above-described embodiments. However, elements of the terminal 1900 are not limited to the above-described example. According to another embodiment, the terminal 1900 may include more or fewer elements than the aforementioned elements. In addition, in a specific case, the transceiver 1901, the controller 1902, and the storage 1903 may be implemented in the form of a single chip.

The transceiver 1901 may include a transmitter and a receiver. The transceiver 1901 may transmit/receive a signal to/from a base station. The signal may include control information and data. To this end, the transceiver 1901 may include an RF transmitter configured to up-convert and amplify the frequency of a transmitted signal, and an RF receiver configured to perform low-noise amplification of a received signal and down-convert the frequency thereof. In addition, the transceiver 1901 may receive a signal through a wireless channel, output the received signal to the controller 1902, and transmit a signal output from the controller 1902 through a wireless channel.

The controller 1902 may be configured to control a series of processes in which the terminal 1900 is able to operate according to the above-described embodiments. For example, the controller 1902 may be configured to perform a method in which the amplitude distributions of the pilot transmission part and the data transmission part are compared to determine an amplitude scaling factor, and power control therefor is performed and transmitted according to an embodiment. In addition, the controller may be configured to acquire PA input/output relationship information by comparing a pilot part of a received signal with a previously known pilot part, and perform compensation for nonlinearity of the PA. To this end, the controller 1902 may include at least one processor. For example, the controller 1902 may include a communication processor (CP) configured to perform control for communication and an application processor (AP) configured to control a higher layer such as an application program.

The storage 1903 may store control information or data included in a signal obtained from the terminal 1900, and may include an area for storing data required for control of the controller 1902 and data generated during control by the controller 1902.

In addition, the terminal 1900 may include an AI device capable of performing at least a part of AI processing. The AI device may include an AI processor, a memory, and/or a communication unit.

For example, the controller 1902 may operate as an AI processor or perform at least a part of functions of the AI processor. The AI processor may be configured to train a neural network by using a program stored in memory. Here, the neural network may be designed to simulate the structure of the human brain on a computer, and may include a plurality of network nodes having weights that simulate neurons of the human neural network. A plurality of network modes may transmit and receive data according to a connection relationship, respectively, so as to simulate synaptic activity of neurons that transmit and receive signals through synapses. Here, the neural network may include a deep learning model developed from a neural network model. In the deep learning model, a plurality of network nodes may exchange data according to a convolution connection relationship while being located in different layers.

The AI processor may include a data learning unit configured to train a neural network for data classification/recognition. The data learning unit may be configured to classify data to be used for learning and acquire data to be learned. The data learning unit may be configured to train the deep learning model by applying the acquired learning data to the deep learning model. For example, the deep learning model may be trained through supervised learning or unsupervised learning. In addition, the data learning unit may be configured to train the deep learning model through reinforcement learning by using feedback as to whether the result of the situation judgment based on the learning is correct. For example, the data learning unit may be configured to classify the received pilot part as data of an input layer, and classify a previously known pilot as data of an output layer by reflecting an amplitude scaling factor thereto. The deep learning model may be trained based on the data of the input layer and the data of the output layer. In . . . addition, inference can be performed using the data part of a received signal, as an input layer, based on the trained model.

The data learning unit may be manufactured in the form of at least one hardware chip and mounted in an AI device. For example, the data learning unit may be manufactured in the form of a dedicated hardware chip for AI, or may be manufactured as a part of a general-purpose processor (central processing unit (CPU)) or a graphics-dedicated processor (graphics processing unit (GPU)) and mounted in the AI device. In addition, the data learning unit may be implemented as a software module. When implemented as a software module (or a program module including instructions), the software module may be stored in a non-transitory computer readable recording medium. In this case, at least one software module may be provided by an operating system (OS) or an application.

For example, the storage 1903 may include a memory of the AI device. The memory may store various programs and data required for the operation of the AI device. The memory may be accessed by the AI processor, and data may be read/written/modified/deleted/updated by the AI processor. For example, the data learning unit may store the trained model associated with input/output relationship information of the PA in the memory.

For example, the communication unit of the AI device may be included in the transceiver 1901.

In addition, the terminal of FIG. 19 may include at least one of the blocks described below in regards to FIG. 21.

FIG. 20 is a block diagram of a base station according to an embodiment.

Referring to FIG. 20, a base station 2000 may include a transceiver 2001, a controller (processor) 2002, and a storage (memory) 2003. The transceiver 2001, the controller 2002, and the storage 2003 of the base station 2000 may operate according to an efficient channel and signal transmission/reception method in the 5G communication system corresponding to the above-described embodiments. However, elements of the base station 2000 are not limited to the above-described example. According to another embodiment, the base station 2000 may include more or fewer elements than the aforementioned elements. In addition, in a specific case, the transceiver 2001, the controller 2002, and the storage 2003 may be implemented in the form of a single chip.

The transceiver 2001 may include a transmitter and a receiver. The transceiver 2001 may transmit/receive a signal to/from a terminal. The signal may include control information and data. To this end, the transceiver 2001 may include an RF transmitter configured to up-convert and amplify the frequency of a transmitted signal, and an RF receiver configured to perform low-noise amplification of a received signal and down-convert the frequency thereof. In addition, the transceiver 2001 may receive a signal through a wireless channel, output the received signal to the controller 2002, and transmit a signal output from the controller 2002 through a wireless channel.

The controller 2002 may be configured to control a series of processes so that the base station 2000 is able to operate according to the above-described embodiments. For example, the controller 2002 may be configured to perform a method in which the amplitude distributions of the pilot transmission part and the data transmission part are compared to determine an amplitude scaling factor, and power control therefor is performed and transmitted. In addition, the controller may be configured to acquire PA input/output relationship information by comparing a pilot part of a received signal with a previously known pilot part, and perform compensation for nonlinearity of the PA. To this end, the controller 2002 may include at least one processor. For example, the controller 2002 may include a communication processor (CP) configured to perform control for communication and an application processor (AP) configured to control a higher layer such as an application program.

The storage 2003 may store control information and data determined by the base station 2000 or control information and data received from the terminal, and may include an area for storing data required for control of the controller 2002 and data generated during control by the controller 1902.

In addition, the terminal 2000 may include an AI device capable of performing at least a part of AI processing. The AI device may include an AI processor, a memory, and/or a communication unit.

For example, the controller 2002 may operate as an AI processor or perform at least a part of functions of the AI processor. The AI processor may be configured to train a neural network by using a program stored in memory. Here, the neural network may be designed to simulate the structure of the human brain on a computer, and may include a plurality of network nodes having weights that simulate neurons of the human neural network. A plurality of network modes may transmit and receive data according to a connection relationship, respectively, so as to simulate synaptic activity of neurons that transmit and receive signals through synapses. Here, the neural network may include a deep learning model developed from a neural network model. In the deep learning model, a plurality of network nodes may exchange data according to a convolution connection relationship while being located in different layers.

The AI processor may include a data learning unit configured to train a neural network for data classification/recognition. The data learning unit may be configured to classify data to be used for learning and acquire data to be learned. The data learning unit may be configured to train the deep learning model by applying the acquired learning data to the deep learning model. For example, the deep learning model may be trained through supervised learning or unsupervised learning. In addition, the data learning unit may be configured to train the deep learning model through reinforcement learning by using feedback as to whether the result of the situation judgment based on the learning is correct. For example, the data learning unit may be configured to classify the received pilot part as data of an input layer, and classify a previously known pilot as data of an output layer by reflecting an amplitude scaling factor thereto. The deep learning model may be trained based on the data of the input layer and the data of the output layer. In addition, inference can be made using the data part of the received signal, as an input layer, based on the trained model.

The data learning unit may be manufactured in the form of at least one hardware chip and mounted in an AI device. For example, the data learning unit may be manufactured in the form of a dedicated hardware chip for AI, or may be manufactured as a part of a general-purpose processor or a graphics-dedicated processor and mounted in the AI device. In addition, the data learning unit may be implemented as a software module. When implemented as a software module (or a program module including instructions), the software module may be stored in a non-transitory computer readable recording medium. In this case, at least one software module may be provided by an operating system (OS) or an application.

For example, the storage 2003 may include a memory of the AI device. The memory may store various programs and data required for the operation of the AI device. The memory may be accessed by the AI processor, and data may be read/written/modified/deleted/updated by the AI processor. For example, the data learning unit may store the trained model associated with input/output relationship information of the PA in the memory.

For example, the communication unit of the AI device may be included in the transceiver 2001.

In addition, the base station of FIG. 20 may include at least one of the blocks described below in regards to FIG. 21.

FIG. 21 illustrates a transmission path of a transmitter 2100 and a reception path of a receiver 2150 according to an embodiment. In the case of downlink, the transmitter may be implemented in a base station (e.g., FIG. 20) and the receiver may be implemented in a terminal (e.g., FIG. 19). In the case of uplink, the transmitter may be implemented in a terminal (e.g., FIG. 19), and the receiver may be implemented in a base station (e.g., FIG. 20). An OFDM modulation method may be applied in the transmitter of FIG. 21, and an OFDM demodulation method may be applied in the receiver.

The transmission path of FIG. 21 may include a channel coding block 2105, a modulation block 2110, an inverse fast Fourier transform (IFFT) block 2115, a cyclic prefix (CP) insertion block 2120, a digital to analog converter (DAC) 2125, and a PA block 2130.

The channel coding block may receive a set of information bits and apply channel coding (e.g., low-density parity check (LDPC)) thereto. The modulation block may modulate (e.g., quadrature phase shift keying (QPSK) or quadrature amplitude modulation (QAM)) the input bits to generate a sequence of frequency domain modulation symbols. The IFFT block may generate time domain output signals by performing IFFT operations on parallel symbol streams. The CP insertion block may insert a CP to a time domain signal. Thereafter, a digital signal may be converted into an analog signal through the DAC block, and transmission power may be amplified through the PA, so as to enable RF signal transmission.

For example, an operation of calculating an amplitude scaling factor $\alpha$ and performing amplitude scaling on a pilot signal in a transmission node according to a method and/or embodiment disclosed herein may be performed before or after the CP insertion block of the transmission path.

The reception path of FIG. 21 may include a low noise amplifier (LNA) 2155, an analog to digital converter (ADC) 2160, a sync block 2165, a CP removal block 2170, a nonlinearity compensation (NC) block 2175, a fast Fourier transform (FFT) block 2180, a demodulation block 2185, and a channel decoding block 2190.

The ADC block may convert an analog signal into a digital signal. The CP removal block may remove the CP to generate a serial time-domain baseband signal. The serial time-domain baseband signal may be converted to a parallel time-domain signal. The NC block may compensate for the nonlinearity of the PA by applying the methods of the above-described embodiments to the signal from which the CP has been removed. That is, it is possible to compensate for the power amplitude distorted by the nonlinearity of the PA. The NC-applied signal may be converted to a frequency domain signal through the FFT block, and an original input data stream may be restored by demodulating and decoding a modulated symbol through the demodulation block and the channel decoding block.

For example, an operation of compensating the nonlinearity of the PA based on the amplitude scaling factor $\alpha$ in the reception node according to an embodiment may be performed in the NC block of the reception path. Specifically, a process of acquiring the above-described input/output relationship information and a process of power compensation for a data signal may be performed in the NC block. In addition, after application of NC, amplitude recovery for the amplitude scaling factor $\alpha$ may be performed, and then a signal having reflected the amplitude recovery may be input to the FFT block. As a specific example, after power compensation in the NC block, the pilot signal may be divided by the amplitude scaling factor $\alpha$ and transmitted to the FFT block.

Each element of FIG. 21 may be implemented using only hardware or a combination of hardware and software/firmware. As an example, at least a part of the elements of FIG. 21 may be implemented in software, whereas other elements may be implemented in configurable hardware or a combination of software and configurable hardware. For example, the FFT block and the IFFT block may be implemented as configurable software algorithms.

In addition, although described as using FFT and IFFT, this is only an example and does not limit the scope of the disclosure. Thus, other types of transforms can be used, such as discrete Fourier transform (DFT) and inverse discrete Fourier transform (IDFT).

The embodiments disclosed in the specification and drawings are only presented as specific examples to easily explain the technical content of the disclosure and help understanding of the disclosure, and are not intended to limit the scope of the disclosure. That is, it is obvious to those skilled in the art that other modifications based on the technical idea of the disclosure are possible. In addition, each of the above embodiments may be operated in combination with each other as needed.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a first device in a wireless communication system, the method comprising:
   deriving an amplitude scaling factor based on a comparison between amplitude distribution of a pilot signal corresponding to a first time resource domain and amplitude distribution of a data signal corresponding to a second time resource domain; and
   transmitting, to a second device, the amplitude scaling factor and a physical channel including the pilot signal and the data signal,
   wherein the pilot signal is transmitted with a power determined based on the amplitude scaling factor, and
   wherein power compensation for the data signal is based on the amplitude scaling factor.

2. The method of claim 1, wherein deriving the amplitude scaling factor comprises:
   multiplying the pilot signal by candidate values of amplitude scaling factors so as to identify amplitude distribution of a pilot signal corresponding to each candidate value; and
   selecting, as the amplitude scaling factor, a candidate value for which a difference between a peak value of the amplitude distribution of the pilot signal corresponding to each candidate value and a peak value of the amplitude distribution of the data signal is smaller than a specific value.

3. The method of claim 1, further comprising calculating a normalization factor for controlling a power of the data signal,
   wherein the pilot signal is transmitted with a power determined based on the amplitude scaling factor and the normalization factor, and
   wherein the data signal is transmitted with a power determined based on the normalization factor.

4. The method of claim 1, wherein the amplitude scaling factor is transmitted based on downlink control information (DCI) or uplink control information (UCI).

5. The method of claim 1, wherein the amplitude scaling factor is transmitted through the physical channel in each slot, and
   wherein an amplitude scaling factor transmitted in slot (n−1) is applied to a pilot signal of a physical channel to be transmitted in slot (n).

6. The method of claim 1, further comprising:
   receiving, from the second device, a first message identifying whether power control for transmission of the physical channel is possible;
   transmitting, to the second device, a second message indicating that power control for transmission of the physical channel is possible, in response to the first message;
   receiving, from the second device, a third message requesting power control for transmission of the physical channel; and
   increasing the power of the pilot signal and the data signal included in the physical channel, in response to the third message.

7. The method of claim 1, further comprising transmitting, to the second device, information indicating whether deriving the amplitude scaling factor is possible.

8. A method performed by a second device in a wireless communication system, the method comprising:
   receiving, from a first device, a physical channel including a pilot signal and a data signal and an amplitude scaling factor associated with power of the pilot signal; and
   performing power compensation for the data signal based on the amplitude scaling factor,
   wherein the amplitude scaling factor is derived based on a comparison between amplitude distribution of the pilot signal corresponding to a first time resource domain and amplitude distribution of the data signal corresponding to a second time resource domain.

9. The method of claim 8, further comprising:
   training a learning model by putting the pilot signal received from the first device into an input layer of the learning model, and applying the amplitude scaling factor to the pilot signal preconfigured in the second device and then putting the pilot signal having the applied amplitude scaling factor into an output layer of the learning model;
   performing inference by putting the data signal received from the first device into the input layer of the trained learning model; and
   performing power compensation for the data signal based on the inference.

10. The method of claim 8, further comprising, after performing power compensation, performing channel estimation based on a signal obtained by dividing the pilot signal by the amplitude scaling factor.

11. A first device in a wireless communication system, the first device comprising:
    a transceiver; and
    a controller configured to derive an amplitude scaling factor based on a comparison between amplitude distribution of a pilot signal corresponding to a first time resource domain and amplitude distribution of a data signal corresponding to a second time resource domain, and transmit, to a second device, the amplitude scaling factor and a physical channel including the pilot signal and the data signal through the transceiver,
    wherein the pilot signal is transmitted with a power determined based on the amplitude scaling factor, and
    wherein power compensation for the data signal is based on the amplitude scaling factor.

12. The first device of claim 11, wherein the controller is further configured to:
    multiply the pilot signal by candidate values of amplitude scaling factors so as to identify amplitude distribution of a pilot signal corresponding to each candidate value; and
    select, as the amplitude scaling factor, a candidate value for which a difference between a peak value of the amplitude distribution of the pilot signal corresponding to each candidate value and a peak value of the amplitude distribution of the data signal is smaller than a specific value.

13. The first device of claim 11, wherein the controller is further configured to calculate a normalization factor for controlling the power of the data signal,
    wherein the pilot signal is transmitted with a power determined based on the amplitude scaling factor and the normalization factor, and
    wherein the data signal is transmitted with a power determined based on the normalization factor.

14. The first device of claim 11, further comprising a power amplifier.

15. A second device in a wireless communication system, the second device comprising:
    a transceiver; and
    a controller configured to receive, from a first device, a physical channel including a pilot signal and a data signal and an amplitude scaling factor associated with power of the pilot signal through the transceiver, and perform power compensation for the data signal based on the amplitude scaling factor, wherein the amplitude scaling factor is derived based on a comparison between amplitude distribution of the pilot signal corresponding to a first time resource domain and amplitude distribution of the data signal corresponding to a second time resource domain.

16. The second device of claim 15, further comprising a learning unit configured to train a learning model by putting the pilot signal received from the first device into an input layer of the learning model, and applying the amplitude scaling factor to the pilot signal preconfigured in the second device and then putting the pilot signal having the applied amplitude scaling factor into an output layer of the learning model; and perform inference by putting the data signal received from the first device into the input layer of the trained learning model, wherein the controller is further configured to perform power compensation for the data signal based on the inference.

* * * * *